(12) United States Patent
Radhakrishnan et al.

(10) Patent No.: US 12,142,999 B2
(45) Date of Patent: Nov. 12, 2024

(54) REMOTE TEMPERATURE SENSING WITH LOAD-LINE

(71) Applicant: Infineon Technologies Austria AG, Villach (AT)

(72) Inventors: Jayadevan Radhakrishnan, San Jose, CA (US); Jens A. Ejury, Fremont, CA (US)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 569 days.

(21) Appl. No.: 17/219,951

(22) Filed: Apr. 1, 2021

(65) Prior Publication Data

US 2022/0320991 A1 Oct. 6, 2022

(51) Int. Cl.
*G01K 1/024* (2021.01)
*G01K 7/02* (2021.01)
*H02M 1/00* (2006.01)
*H02M 1/32* (2007.01)

(52) U.S. Cl.
CPC .......... *H02M 1/0025* (2021.05); *G01K 1/024* (2013.01); *G01K 7/028* (2013.01); *H02M 1/327* (2021.05); *G01K 2219/00* (2013.01)

(58) Field of Classification Search
CPC .. H02M 1/0025; H02M 1/0032; H02M 1/327; H02M 1/0009; H02M 1/0012; H02M 3/1584; H02M 3/1586; G01K 2219/00; G01K 7/028; G01K 7/425; G01K 7/015; G01K 1/024; G01K 1/026; G01K 1/045; G01K 11/32; G01K 15/005; G01K 2215/00; G01K 3/005; G01R 19/2513; G01R 21/133; G01R 31/30; G06F 1/3203; G06F 1/206; G06F 2119/08

USPC ........ 340/870.17, 3.1, 525; 374/166, 170, 1, 374/179; 700/278, 299; 702/130, 99, 64, 702/60, 127, 136, 183, 189, 118, 132, 85, 702/1

See application file for complete search history.

(56) References Cited

U.S. PATENT DOCUMENTS

| | | | |
|---|---|---|---|
| 2008/0157742 A1* | 7/2008 | Martin | H02M 3/1584 323/284 |
| 2011/0121795 A1* | 5/2011 | Vulih | H02M 3/1584 323/318 |

(Continued)

OTHER PUBLICATIONS

"Altera Enpirion® Power Datasheet EC7401QI 4-Phase PWM Controller with 8-Bit DAC Code," Apr. 12, 2019, pp. 1-44 (Year: 2019).*

(Continued)

*Primary Examiner* — Jeffrey P Aiello
(74) *Attorney, Agent, or Firm* — Cooper Legal Group LLC

(57) ABSTRACT

A controller for a power converter includes an output terminal operative to output a modulation signal for controlling a phase current of the power converter. A modulator is operative to generate the modulation signal such that an output voltage of the power converter follows a first portion of a load-line when load current is above a first threshold, the first portion of the load-line having a first slope that determines a rate of change of the output voltage as a function of the load current. An interface is operative to receive a temperature signal. Circuitry is operative to change the first threshold in response to receipt of the temperature signal.

20 Claims, 18 Drawing Sheets

(56) References Cited

U.S. PATENT DOCUMENTS

| | | | |
|---|---|---|---|
| 2012/0091815 A1* | 4/2012 | Richards, III | H02M 1/32 |
| | | | 307/80 |
| 2013/0241519 A1* | 9/2013 | Li | H02M 3/1584 |
| | | | 323/311 |
| 2014/0198538 A1* | 7/2014 | Kimura | H02M 3/33507 |
| | | | 363/21.09 |
| 2015/0258947 A1* | 9/2015 | Harkins | B60L 1/14 |
| | | | 307/10.1 |
| 2017/0077819 A1* | 3/2017 | Andres | H02M 3/3376 |
| 2018/0316255 A1* | 11/2018 | Tang | H02M 1/084 |
| 2018/0337599 A1* | 11/2018 | Chen | H02M 3/158 |
| 2021/0218334 A1* | 7/2021 | Radhakrishnan | H02M 3/1566 |
| 2022/0158555 A1* | 5/2022 | Jovanovic | H02M 1/0025 |

OTHER PUBLICATIONS

David Vaseliou, et al., "Optimizing Remote Temperature Sensor Design", Texas Instruments, Application Report, Jan. 2017, Revised Dec. 2019, 18 pages. (Year: 2017).*

David Vaseliou, et al., "Optimizing Remote Temperature Sensor Design", Texas Instruments, Application Report, Jan. 2017, Revised Dec. 2019, 18 pages.

"I-V Characteristic Curves", Electronics Tutorials.

"1° C. Multiple Temperature Sensor with HW Thermal Shutdown & Hottest of Thermal Zones", Microchip Technology Inc., 2014, 53 pages.

Michael Berktold, "CPU Monitoring With DTS/PECI", Intel Corporation, 23 pages, Sep. 2010.

* cited by examiner

REMOTE TEMPERATURE SENSING WITH LOAD-LINE

TECHNICAL FIELD

The present disclosure generally relates to circuitry.

BACKGROUND

The slope of a load-line of a power converter determines a rate of change of power converter output voltage as a function of load current. In many applications it may be beneficial to adjust or modify the load-line behavior of a power converter. For example, in the context of an Ethernet router that processes network packets, the Ethernet router consumes less current when idle (i.e., when few packets or no are passing through the router). The current of the Ethernet router increases substantially when processing packets. An increase in load current, such as load current of an Ethernet router, may provide an increase in temperature.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some embodiments, a controller for a power converter is provided. The controller comprises: an output terminal operative to output a modulation signal for controlling a phase current of the power converter; a modulator operative to generate the modulation signal such that an output voltage of the power converter follows a first portion of a load-line when load current exceeds a first threshold, the first portion of the load-line having a first slope that determines a rate of change of the output voltage as a function of the load current; an interface operative to receive a temperature signal; and circuitry operative to change the first threshold in response to receipt of the temperature signal.

According to some embodiments, a method for controlling a power converter is provided. The method comprises: generating a modulation signal for controlling a phase current of the power converter such that an output voltage of the power converter follows a first portion of a load-line when load current exceeds a first threshold, the first portion of the load-line having a first slope that determines a rate of change of the output voltage as a function of a load current; receiving a temperature signal; and changing the first threshold in response to the temperature signal.

According to some embodiments, an electronic system is provided. The electronic system comprises: a plurality of power stages to output a corresponding plurality of phase currents to a load; and a controller comprising: a modulator operative to generate a modulation signal for controlling each of the plurality of power stages to output the corresponding plurality of phase currents, wherein an output voltage of the plurality of power stages follows a load-line when load current is between a first threshold and a second threshold, the load-line having a slope that determines a rate of change of the output voltage as a function of the load current; an interface operative to receive a signal indicating a change to the first threshold and the second threshold; and circuitry operative to change at least one of the first threshold or the second threshold in response the signal indicating the change.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
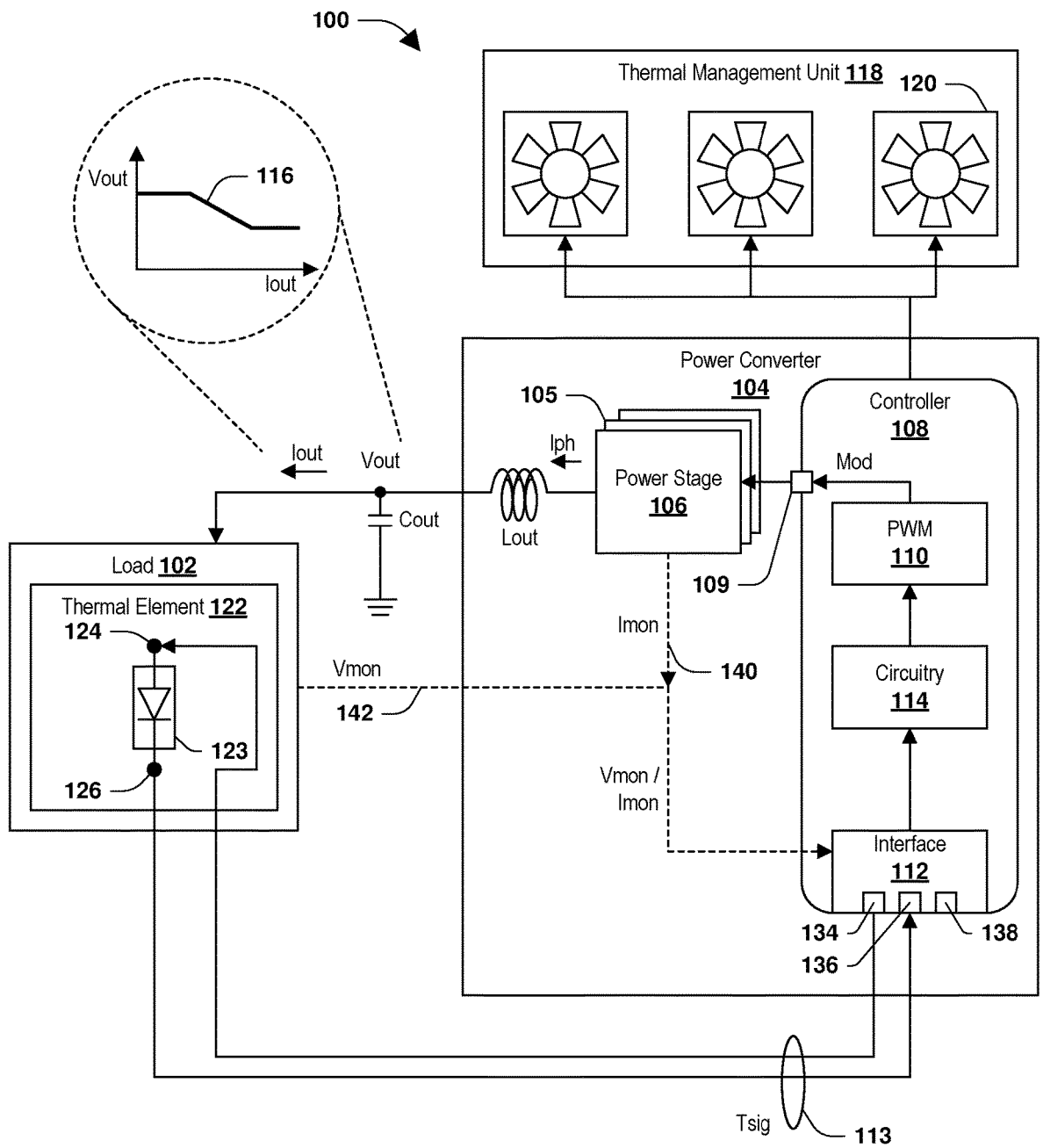
FIG. 1A illustrates an electronic system including a load and a power converter, according to some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

The embodiments described provide an apparatus, method, and electronic system for controlling a power converter. The power converter includes a first output terminal operative to output a modulation signal for controlling a phase current of the power converter. A modulator is operative to generate the modulation signal such that an output voltage of the power converter follows a first portion of a load-line when load current is above a first threshold, follows a second portion of the load-line when load current is below the first threshold, and follows a third portion of the load-line when load current is above a third threshold. The first portion of the load-line has a first slope that determines a rate of change of the output voltage as a function of the load current. An interface is operative to receive a temperature signal. Circuitry is operative to change the first threshold in response to receipt of the temperature signal.

The term "power converter" as used herein broadly refers to any type of power converter or voltage regulator (VR) that provides one or more regulated voltages to one or more electronic loads such as an Ethernet switch, an Ethernet router, an ASIC (application-specification integrated circuit), a memory device, a processor such as a central processing unit (CPU), a microprocessor, a graphics processing unit (GPU), a digital signal processor (DSP), an artificial intelligence (AI) accelerator, an image processor, a network or packet processor, a coprocessor, a multi-core processor, a front-end processor, a baseband processor, a field programmable gate array (FPGA), etc. For example, the power converter may be a buck converter, a boost converter, a buck-boost converter, a switched capacitor voltage regulator, a step-down converter, etc. The power converter may be implemented as a power device module.

The term "power device module" as used herein means a functional assembly, such as a packaged functional assembly, that includes at least one power switch of a power stage used in converting a voltage from one level to another level, e.g., as in power conversion and voltage regulation. The power device module may also include a driver circuit for driving the at least one power switch. The power device module may additionally include a controller for controlling the driver circuit so as to implement the power converter. The controller and/or driver functionality may instead be implemented outside the power device module. The driver circuit for the at least one power switch included in the power device module also may be outside the power device module. Various passive components such as capacitors and/or inductors that make up the power converter may be included in the power device module, surface mounted to the power device module, located on a separate board, etc. Described next in more detail are various embodiments of the power converter, a method of controlling the power converter, and an electronic system that includes the power converter.

FIG. 1A illustrates an electronic system 100 including a load 102 and a power converter 104, according to some embodiments. FIGS. 1B-1I illustrate a thermal element 122 of the electronic system 100, according to some embodiments. The power converter 104 is operative to regulate an output voltage (Vout) provided to the load 102. The load 102 may be any type of electronic load requiring a regulated supply voltage. For example, the load 102 may be an Ethernet switch, an Ethernet router, an ASIC, a memory device, a processor such as a CPU, a microprocessor, a GPU, a DSP, an AI accelerator, an image processor, a network or packet processor, a coprocessor, a multi-core processor, a front-end processor, a baseband processor, etc. In an example, the power converter 104 is illustrated as a multi-phase buck converter including a plurality of power stages 105. Each of the plurality of power stages 105 is operative to provide a phase current (Iph) to the load 102 through a corresponding output inductor (Lout) and an output capacitor (Cout) that reduces output voltage ripple. A load current (Iout) is drawn by the load 102 and a controller 108 is operative to control the power converter 104 to output the output voltage Vout in response to the load current Iout.

The controller 108 is operative to output a modulation signal (Mod) through an output terminal 109 for controlling the phase currents Iph of each of the plurality of power stages 105. In some embodiments, the modulation signal Mod comprises a plurality of modulation signals and the output terminal 109 comprises a plurality of output terminals, where each modulation signal controls a corresponding power stage of the plurality of power stages 105. In this embodiment, the power converter 104 is a multi-phase power converter with the plurality of power stages 105 arranged in parallel. Each power stage of the plurality of power stages 105 has a corresponding phase and outputs a corresponding phase current Iph through a corresponding inductor to the load 102. During operation, the plurality of phases is active at spaced intervals equal to 360°/n throughout a switching period, where n corresponds to a number of the plurality of power stages 105 and the number of corresponding phases of the phase currents Iph. The plurality of power stages 105 shares the output capacitor Cout and share an input capacitor (not shown). In general, the power converter 104 may be any type of power converter or voltage regulator that provides one or more regulated output voltages as the output voltage Vout to the load 102. For example, the power converter 104 may be a buck converter as illustrated in FIG. 1A, or may be a boost converter, a buck-boost converter, a switched capacitor voltage regulator, a step-down converter, etc., and may be implemented as a power device module, as set forth above. In another embodiment, the power converter 104 is a single-phase power converter including a power stage 106, operative as a single-phase power stage, to output the output voltage Vout through a corresponding inductor to the load 102. Other configurations and/or arrangements of the power converter 104 are within the scope of the present disclosure.

The controller 108 includes a modulator 110 to generate the modulation signal Mod for controlling the phase current Iph of each of the plurality of power stages 105 so as to regulate the output voltage Vout provided to the load 102. According to an embodiment, the modulator 110 implements the modulation signal Mod through pulse width modulation (PWM), set forth in greater detail below. According to an embodiment, the controller 108 is a digital multi-phase controller with a programmable non-linear load-line. The programmable non-linear load-line is programmed such that the output voltage Vout provided to the load 102 follows the load current Iout. According to another embodiment, the controller 108 is a digital multi-phase controller with a plurality of programmable load-lines. Each load-line of the plurality of programmable load-lines is enabled at corresponding load currents Iout such that the output voltage Vout provided to the load 102 follows each load current Iout. According to another embodiment, the controller 108 is a digital multi-phase controller with one or more static (e.g., fixed non-programmable) load-lines. The one or more static load-lines may be set with static load-line values external to the controller 108 to control the load-line such that the output voltage Vout provided to the load 102 follows the load current Iout. According to another embodiment, the controller 108 is an analog multi-phase controller with one or more static load-lines. The one or more static load-lines may be updated and/or controlled external to the controller 108 to control the load-line such that the output voltage Vout provided to the load 102 follows the load current Iout. According to yet another embodiment, the controller 108 is a digital or analog single-phase controller with one or more static load-lines or one or more programmable load-lines. Other configurations and/or arrangements of the controller 108 are within the scope of the present disclosure.

The controller 108 includes an interface 112 to receive current information (Imon) indicating the load current Iout of the load 102 and voltage information (Vmon) indicating the output voltage Vout provided to the load 102. The current information Imon is sensed and communicated by the plurality of power stages 105 to the controller 108 along a power stage bus 140. The current information Imon is received by the controller 108 at the interface 112. The voltage information Vmon is sensed and communicated by the load 102 to the controller 108 along a load bus 142. The voltage information Vmon is received by the controller 108 at the interface 112. In response to the current information Imon and/or the voltage information Vmon, the controller 108 generates and outputs the modulation signal Mod through the output terminal 109 to control the plurality of power stages 105.

According to some embodiments, the controller 108 is operative to adjust the output voltage Vout along a load-line 116 in response to the load current Iout communicated by the current information Imon. The load-line 116 may also be known as a voltage regulation setpoint. The load-line 116 determines a target voltage to which the output voltage Vout of the power converter 104 is regulated. According to some embodiments, the output voltage Vout of the power converter 104 varies with the load current Iout and follows the load-line 116. The controller includes circuitry 114 operative to follow the load-line 116 such that the target voltage follows the load current Iout, which is communicated by way of the current information Imon. According to some embodiments, the circuitry 114 also receives the voltage information Vmon indicating the output voltage Vout provided to the load 102. The circuitry 114 controls the modulator 110 to output the modulation signal Mod such that the output voltage Vout provided to the load 102 also matches the target voltage indicated by the load-line 116.

According to some embodiments, the modulator 110 generates a modulation signal Mod for each power stage of the plurality of power stages 105 such that the output voltage Vout of the power converter 104 follows the load-line 116. The load-line 116 comprises a plurality of portions, where each portion of the load-line 116 has at least one of a zero slope or a non-zero slope. The slope of each portion of the load-line 116 determines a rate of change of the output voltage Vout as a function of the load current Iout. According to some embodiments, the load-line 116 is linear or non-linear, and the load-line 116 includes portions that are static or variable. Other configurations and/or arrangements of the circuitry 114 and the modulator 110 are within the scope of the present disclosure.

According to some embodiments, the circuitry 114 of the controller 108 is operative to change or dynamically change the load-line 116 in response to a temperature signal (Tsig) received at the interface 112 of the controller 108. In other words, the circuitry 114 adjusts the load-line 116 in response to the temperature signal Tsig. The interface 112 receives the temperature signal Tsig from the load 102 by way of a first communication bus 113. The temperature signal Tsig indicates a temperature value corresponding to absolute temperature of the load 102. The controller 108 responds to the temperature signal Tsig to control operation of a thermal management unit 118. The thermal management unit 118 comprises at least one of heat sinks, cooling fans, heat pipes, or thick metal traces such as copper. The circuitry 114 of the controller 108 responds to the temperature signal Tsig to control at least one of an operation or a speed of a fan or a plurality of fans in the thermal management unit 118, such as a fan 120.

Figure 1B:
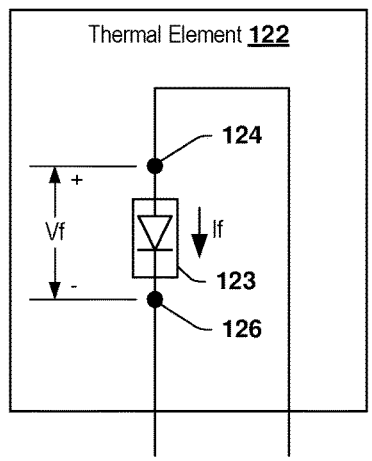
FIGS. 1B-1I illustrate a thermal element of the electronic system, according to some embodiments.

According to some embodiments, the load 102 includes a thermal element 122 to output the temperature signal Tsig. The thermal element 122 is illustrated in FIGS. 1A and 1B as a thermal diode 123 connected across a first node 124 and a second node 126 with a forward voltage Vf and a forward current If. The first communication bus 113 connects the first node 124 to a first terminal 134 of the interface 112 and the second node 126 to a second terminal 136 of the interface 112. The first communication bus 113 may also connect embodiments of thermal element 122 having a third node to a third terminal 138 of the interface 112. The thermal element 122 may be any type element that provides temperature information (e.g., temperature signal Tsig). According to some embodiments, the load 102 includes a plurality of thermal elements 122 and the interface 112 includes a plurality of corresponding terminals for communication of a plurality of temperature signals Tsig along the first communication bus 113. In an embodiment of a network/packet processor as the load 102, the load 102 may include a CPU having a digital temperature sensor (DTS) as the thermal element 122 and communicate temperature information over the first communication bus 113. However, a CPU DTS may provide variations in accuracy greater than +/−3° Celsius (C). The thermal diode 123, as illustrated in FIGS. 1A and 1B, may provide greater accuracy compared to a CPU DTS.

Figure 1C:
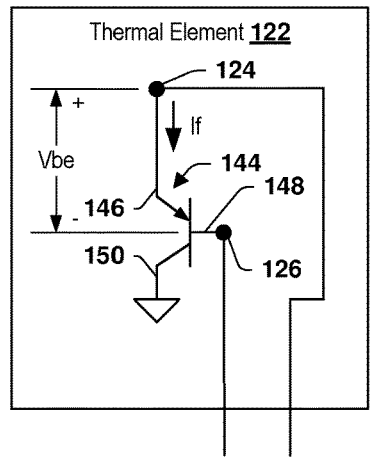

FIG. 1C illustrates the thermal element 122 in the form of a substrate transistor 144 connected across the first node 124 and the second node 126, according to some embodiments. The substrate transistor 144, also known as a substrate diode, is commonly configured as a PNP transistor, which is present in many CPUs, FPGAs, ASICs, etc. The substrate transistor 144 provides the temperature signal Tsig. The substrate transistor 144 is provided in a transistor-connected configuration with an emitter 146 coupled to the first node 124, a base 148 coupled to the second node 126, and a collector 150 coupled to local ground (e.g., a substrate ground of a CPU, FPGA, ASIC, etc.). During operation and according to an example, the first node 124 (i.e., the emitter 146) receives a positive voltage connection from the first terminal 134 of the interface 112 and the second node 126 (i.e., the base 148) provides a negative voltage reference to the second terminal 136 of the interface 112. Forward current If flows across the substrate transistor 144. A base-emitter voltage Vbe is provided across the first node 124 and the second node 126, which corresponds to temperature. The base-emitter voltage Vbe provides the temperature signal Tsig. In another example, the substrate transistor 144 may be configured as a three terminal circuit element with the collector 150 coupled externally to ground, such as illustrated by transistor 180 in FIG. 1G.

Figure 1D:
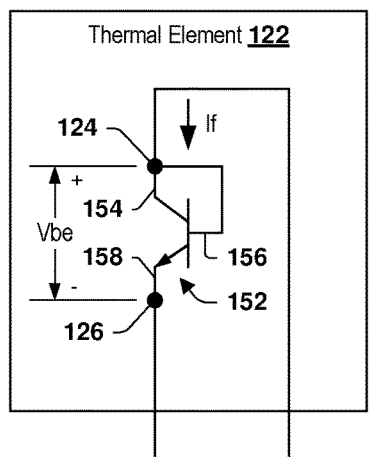

FIG. 1D illustrates the thermal element 122 in the form of a transistor 152 connected across the first node 124 and the second node 126, according to some embodiments. The transistor 152 is an NPN transistor and provides the temperature signal Tsig. The transistor 152 is provided in a diode-connected configuration with a collector 154 and a base 156 coupled to the first node 124 and an emitter 158 coupled to the second node 126. During operation and according to an example, the first node 124 (i.e., the collector 154 and the base 156) receives a positive voltage connection from the first terminal 134 of the interface 112 and the second node 126 (i.e., the emitter 158) provides a negative voltage reference to the second terminal 136 of the interface 112. Forward current If flows across the transistor 152. A base-emitter voltage Vbe is provided across the first node 124 and the second node 126, which corresponds to temperature. The base-emitter voltage Vbe provides the temperature signal Tsig.

Figure 1E:
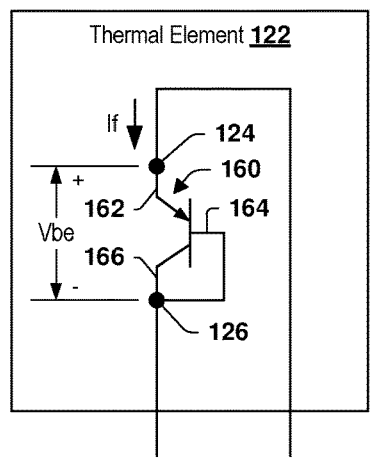

FIG. 1E illustrates the thermal element 122 in the form of a transistor 160 connected across the first node 124 and the second node 126, according to some embodiments. The transistor 160 is an PNP transistor and provides the temperature signal Tsig. The transistor 160 is provided in a diode-connected configuration with an emitter 162 coupled to the first node 124 and a base 164 and a collector 166 coupled to the second node 126. During operation and according to an example, the first node 124 (i.e., the emitter 162) receives a positive voltage connection from the first terminal 134 of the interface 112 and the second node 126 (i.e., the base 164 and the collector 166) provides a negative voltage reference to the second terminal 136 of the interface 112. Forward current If flows across the transistor 160. A base-emitter voltage Vbe is provided across the first node 124 and the second node 126, which corresponds to temperature. The base-emitter voltage Vbe provides the temperature signal Tsig.

Figure 1F:
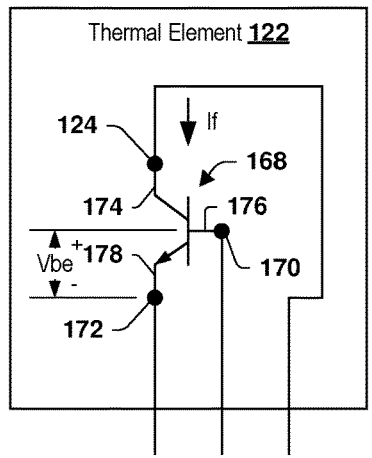

FIG. 1F illustrates the thermal element 122 in the form of a transistor 168 connected to the first node 124, a second node 170, and a third node 172, according to some embodiments. The transistor 168 is a discrete NPN transistor and provides the temperature signal Tsig. The transistor 168 is provided with a collector 174 coupled to the first node 124, a base 164 coupled to the second node 170, and an emitter 178 coupled to the third node 172. During operation and according to an example, the first node 124 (i.e., the collector 174) receives a positive voltage connection from the first terminal 134 of the interface 112. The second node 170 (i.e., the base 176) is connected to the second terminal 136 of the interface 112 and the third node (i.e., the emitter 178) is connected to the third terminal 138 of the interface 112. The interface 112 includes internal switches to configure the transistor 168 as a thermal sensor. For example, the interface 112 may electrically connect the first node 124 and the second node 170 to provide a diode-connected configuration for the transistor 168. In this example, the base 176 also receives the positive voltage connection from the second terminal 136 of the interface 112. The third node 172 (i.e., the emitter 178) provides a negative voltage reference to the third terminal 138 of the interface 112. Forward current If flows across the transistor 168. A base-emitter voltage Vbe is then provided across the second node 170 and the third node 172, which corresponds to temperature. The base-emitter voltage Vbe provides the temperature signal Tsig. In an example, the transistor 168 is a discrete three terminal NPN transistor for temperature measurement where the collector 174 is connectable to ground.

Figure 1G:
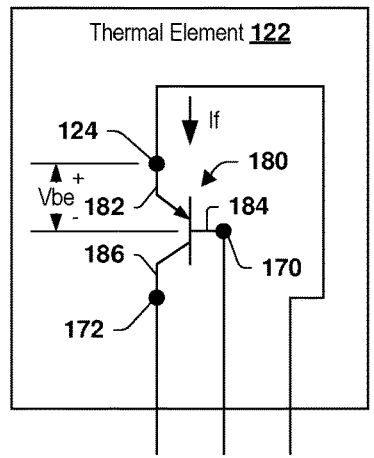

FIG. 1G illustrates the thermal element 122 in the form of a transistor 180 connected to the first node 124, the second node 170, and the third node 172, according to some embodiments. In an example, the transistor 180 is a discrete PNP transistor and provides the temperature signal Tsig. The transistor 180 is provided with an emitter 182 coupled to the first node 124, a base 184 coupled to the second node 170, and a collector 186 coupled to the third node 172. During operation and according to an example, the first node 124 (i.e., the emitter 182) receives a positive voltage connection from the first terminal 134 of the interface 112. The second node 170 (i.e., the base 184) provides a negative voltage reference to the second terminal 136 of the interface 112. Forward current If flows across the transistor 180. A base-emitter voltage Vbe is then provided across the first node 124 and the second node 170, which corresponds to temperature. The base-emitter voltage Vbe provides the temperature signal Tsig. In an example, the transistor 180 is a three terminal substrate PNP transistor for temperature measurement, where the collector 186 is connectable to external ground.

Figure 1H:
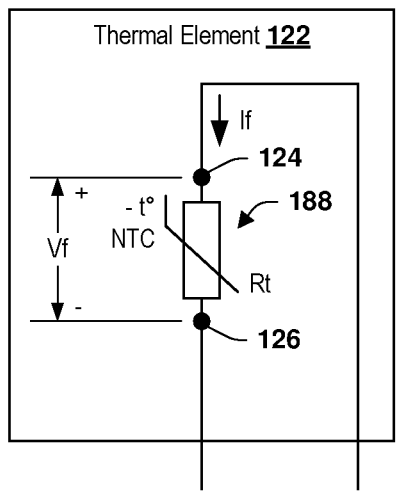

FIG. 1H illustrates the thermal element 122 in the form of a thermistor 188 connected to the first node 124 and the second node 126, according to an embodiment. The thermistor 188 is a negative coefficient type (NTC) thermistor and provides the temperature signal Tsig. The thermistor 188 is a type of resistor with a resistance that is strongly dependent on temperature. During operation and according to an example, resistance of the thermistor 188 decreases as temperature increases. Over large changes in temperature, calibration of the thermistor 188 may be provided. Over small changes in temperature, resistance of the thermistor 188 is linearly proportional to temperature. The first node 124 receives a positive voltage connection from the first terminal 134 of the interface 112. The second node 126 provides a negative voltage reference to the second terminal 136 of the interface 112. Forward current If flows across the thermistor 188. A forward voltage Vf is then provided across the first node 124 and the second node 170, which corresponds to temperature. The forward voltage Vf provides the temperature signal Tsig.

Figure 1I:
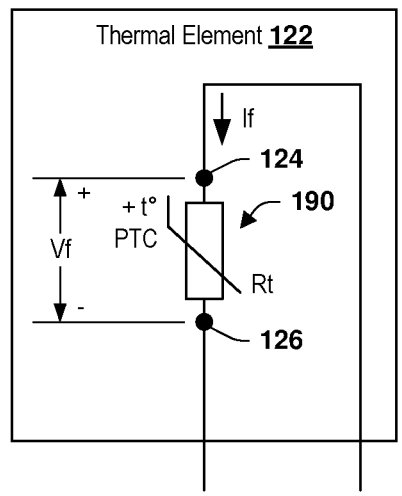

FIG. 1I illustrates the thermal element 122 in the form of a thermistor 190 connected to the first node 124 and the second node 126, according to an embodiment. The thermistor 190 is a positive coefficient type (PTC) thermistor and provides the temperature signal Tsig. The thermistor 190 is a type of resistor whose resistance is strongly dependent on temperature. During operation and according to an example, resistance of the thermistor 190 increases as temperature increases. Below the Curie point temperature, the high dielectric constant of the thermistor 190 prevents the formation of potential barriers between the crystal grains, leading to a low resistance. In this region the thermistor 190 has a small negative temperature coefficient. At the Curie point temperature, the dielectric constant drops sufficiently to allow the formation of potential barriers at the grain boundaries, and the resistance increases sharply with temperature. At even higher temperatures, the thermistor 190 may function as an NTC thermistor, set forth above. The first node 124 receives a positive voltage connection from the first terminal 134 of the interface 112. The second node 126 provides a negative voltage reference to the second terminal 136 of the interface 112. Forward current If flows across the transistor 180. A forward voltage Vf is then provided across the first node 124 and the second node 170, which corresponds to temperature. The forward voltage Vf provides the temperature signal Tsig. Other configurations and/or arrangements of the thermal element 122 are within the scope of the present disclosure.

Figure 2A:
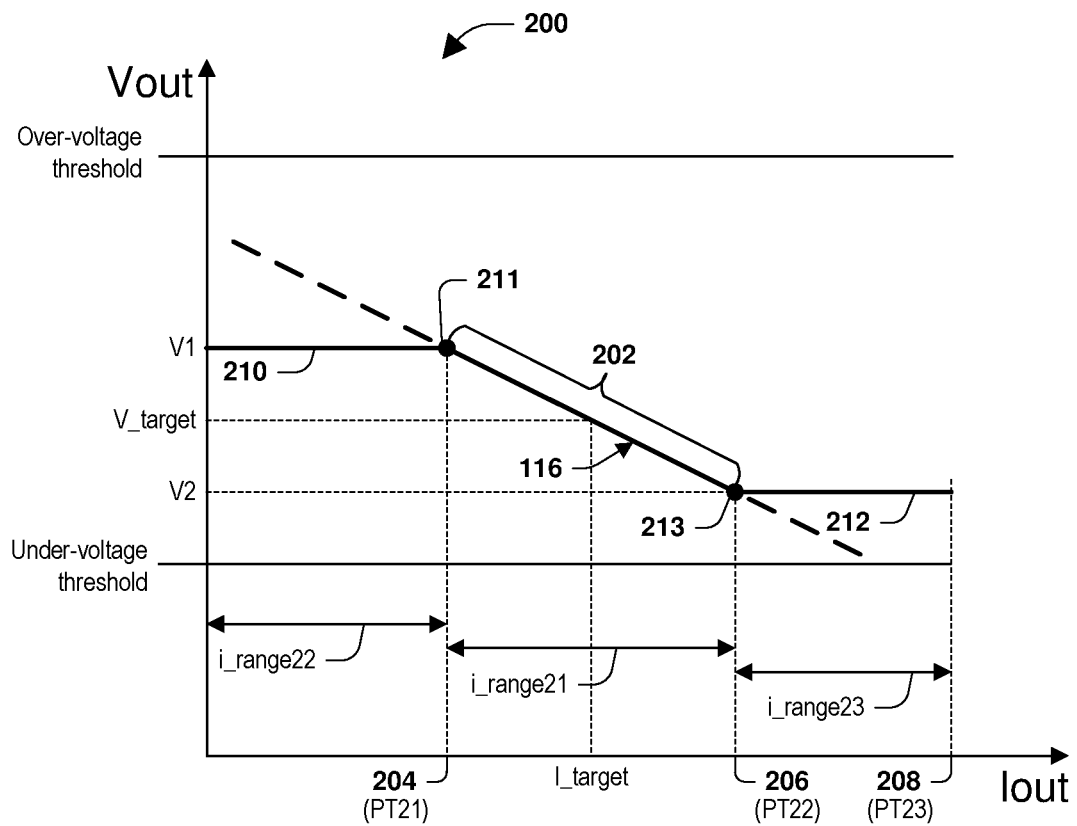
FIGS. 2A-2D illustrate a graph of a load-line to control a power converter to output an output voltage as a function of a load current, according to some embodiments.

FIG. 2A illustrates a graph 200 of the load-line 116 to control the power converter 104 to output the output voltage Vout as a function of the load current Iout, according to some embodiments. The output voltage Vout of the graph 200 is a target output voltage that follows the load-line 116 in response to the load current Iout. In an embodiment, the target output voltage is determined from the voltage information Vmon and the load current Iout is determined from the current information Imon. Other arrangements and/or configurations for determining the output voltage Vout or the load current Iout are within the scope of the present disclosure.

The load-line 116 is a non-linear load-line. The load-line 116 comprises a first portion 202 having a first slope S21 that determines a rate of change of the output voltage Vout as a function of a rate of change of the load current Iout. The first slope S21 of the first portion 202 of the load-line 116 corresponds to an absolute value of (a change in the output voltage Vout) divided by (a change in the load current Iout). The first slope S21 corresponds to the following equation 1:

$$S = \left| \frac{(V2 - V1)}{(I2 - I1)} \right| \qquad \text{Equation 1}$$

where S is a slope of a portion of a load-line, V1 is a first voltage value, V2 is a second voltage value, I1 is a first load current value, and I2 is a second load current value. The controller 108 controls the power converter 104 to produce the output voltage Vout in the first portion 202 of the load-line 116 such that the first slope S21 follows the slope S of equation 1. The controller 108 controls the power converter 104 to produce the output voltage Vout in the first portion 202 of the load-line 116 to have the first voltage value V1 less than an over-voltage threshold and the second voltage value V2 greater than an under-voltage threshold.

The first portion 202 of the load-line 116 is between a first threshold 204, having a first load current value PT21, and a second threshold 206, having a second load current value PT22. The second load current value PT22 is greater than the first load current value PT21. The controller 108 controls the first voltage value V1 to correspond to the first threshold 204 and controls the second voltage value V2 to correspond to the second threshold 206. The first portion 202 of the load-line 116 follows a first current range i_range21 of the load current Iout. A second portion 210 of the load-line 116 is contiguous with the first portion 202 at a first intersection 211. The second portion 210 follows a second current range i_range22, which is less than the first current range i_range21. A third portion 212 of load-line 116 is contiguous with the first portion 202 at a second intersection 213. The third portion 212 follows a third current range i_range23, which is greater than the first current range i_range21.

According to some embodiments, the first portion 202, the second portion 210, and the third portion 212 of the load-line 116 are implemented by the power converter 104 when the load 102 draws a varying amount of load current Iout over the current ranges (e.g., the first current range i_range21, the second current range i_range22, and the third current range i_range23). According to an example of a network/packet processor as the load 102, the load 102 consumes the load current Iout according to an operational state of the load 102, which may vary across the current ranges. The load 102 consumes an idle current as the load current Iout when idle (i.e., an idle state with no packet traffic) and consumes a processing current as the load current Iout when processing (i.e., a processing state when processing packet traffic). The processing current is greater than the idle current.

During initial boot of the power converter 104, the controller 108 outputs the modulation signal Mod to control the power converter 104 to output the phase current Iph to the load 102. The controller 108 outputs the modulation signal Mod until a predetermined target voltage V_target, as indicated by the voltage information Vmon, is reached. According to an embodiment, the target voltage V_target is a design voltage supplied to the load 102. According to an embodiment, the target voltage V_target is within a design voltage range supplied to the load 102. Because the output voltage Vout depends on and varies with the load current Iout, the controller 108 also outputs the modulation signal Mod until a predetermined target current I_target, as indicated by the current information Imon, is reached. Due to inductance of the load 102 or inductance of the output inductors Lout corresponding to the plurality of power stages 105, the voltage information Vmon may indicate that the output voltage has reached the target voltage V_target but the current information Imon may indicate that the target current I_target has not been reached. In this case, the controller continues to output the modulation signal Mod, even though the voltage information Vmon indicates a voltage above the target voltage V_target, until the target current I_target as indicated by the current information Imon is reached.

During continuous operation of the power converter 104, the controller 108 monitors the current information Imon and controls the output voltage Vout to correspond to the load current Iout along the load-line 116. The controller 108 controls the output voltage Vout to correspond to the load current Iout along a portion or portions of the load-line 116. For example, in the case of a network/packet processor as the load 102, the target current I_target may be 400 amps (A) corresponding to an idle state of the load 102, and the target voltage V_target may be 0.75 Volts (V) corresponding to a design voltage of the load 102. In another example, the target current I_target may be a higher value, such as 1000 A or 1200 A, corresponding to a processing state of the load 102. During continuous operation of the power converter 104, the load 102 may fluctuate between the idle state and the processing state, and the load current Iout may rapidly change. For example, the load current Iout may rapidly change from 400 A to 1000 A or 1200 A on the order of 500 nanoseconds (ns). The load current Iout of the load 102 may change between the first current range i_range21, the second current range i_range22, or the third current range i_range23. In response, the controller 108 controls the power converter 104 to output the output voltage Vout corresponding to the first portion 202, the second portion 210, or the third portion 212 of the load-line 116. Other values of the target current I_target or the target voltage V_target are within the scope of the present disclosure.

During continuous operation of the power converter 104, the load current Iout of the load 102 may be the target current I_target and the output voltage Vout is controlled along the first portion 202 of the load-line 116 to be the target voltage V_target. The load current Iout of the load 102 may transition to be less than the first threshold 204 (e.g., when the network/packet processor as the load 102 enters the idle state and draws the idle current as the load current Iout). In this case, the load current Iout of the load 102 corresponds to the second current range i_range22 and the output voltage Vout is controlled to follow the second portion 210 of the load-line 116. The controller 108 controls the power converter 104 to output the first voltage value V1, where the first voltage value V1 is less than the over-voltage threshold. The load current Iout of the load 102 may transition to be greater than the second threshold 206 (e.g., when the network/packet processor as the load 102 enters the processing state and draws the processing current as the load current Iout). In this case, the load current Iout of the load 102 corresponds to the third current range i_range23 and the output voltage Vout is controlled to follow the third portion 212 of the load-line 116. The controller 108 controls the power converter 104 to output the second voltage value V2, where the second voltage value V2 is less than the first voltage value V1 and greater than the under-voltage threshold.

According to some embodiments, if load current Iout exceeds the second threshold 206, the controller 108 controls the power converter 104 to disable the load current Iout. According to some embodiments, if load current Iout exceeds the second threshold 206, the controller 108 controls the power converter 104 to output the second voltage value V2. If load current Iout exceeds the third threshold 208, the controller 108 controls the power converter 104 to at least one of disable or isolate the load current Iout. According to some embodiments, the third threshold 208 exceeds a design current for the load 102 and is a maximum load current Iout to be output by the power converter 104. Isolation of the load current Iout from the load 102 is provided, for example, by an isolation unit (not shown), such as a gate, a high current tristate buffer gate, etc. According to some embodiments, the third threshold 208 is the same as the second threshold 206 such that the controller 108 controls the power converter 104 to at least one of disable or isolate the load current Iout above the second threshold 206. Other arrangements and/or configurations of the first threshold 204, the second threshold 206, or the third threshold 208 are within the scope of the present disclosure.

According to some embodiments, the second portion 210 of the load-line 116 has a second slope S22 and is implemented by the controller 108 when the load current Iout is within the second range i_range22. The controller 108 controls the power converter 104 to produce the output voltage Vout in the second portion 210 of the load-line 116 such that the second slope S22 follows the slope S provided according to equation 1, set forth above. According to an example, the second slope S22 is a non-zero slope. According to an example, the second slope S22 is a zero slope. According to another example, the second slope S22 is a substantially zero slope wherein the first voltage value V1 changes at least one of less than five percent, less than three percent, or less than one percent. According to an example of a network/packet processor as the load 102, a change in the first voltage value V1 less than one percent may provide greater control of the output voltage Vout when the load current Iout is reduced below the first threshold 204, such as when the load 102 enters the idle state.

According to some embodiments, the third portion 212 of the load-line 116 has a third slope S23 and is implemented by the controller 108 when the load current Iout is within the third range i_range23. The controller 108 controls the power converter 104 to produce the output voltage Vout in the third portion 212 of the load-line 116 such that the third slope S23 follows the slope S provided according to equation 1, set forth above. According to an example, the third slope S23 is a non-zero slope. According to an example, the third slope S23 is a zero slope. According to another example, the third slope S23 is a substantially zero slope wherein the second voltage value V2 changes at least one of less than five percent, less than three percent, or less than one percent. According to an example of a network/packet processor as the load 102, a change in the second voltage value V2 less than one percent may provide greater control of the output voltage Vout when the load current Iout is above the second threshold 206. In this case, the load 102 draws a load current Iout which may exceed an anticipated design current as indicated by the third threshold 208. The power converter 104 maintains the output voltage Vout at the second voltage value V2 such that the load current Iout drawn by the load 102 may be reduced before the load current Iout exceeds the third threshold 208.

Figure 2B:
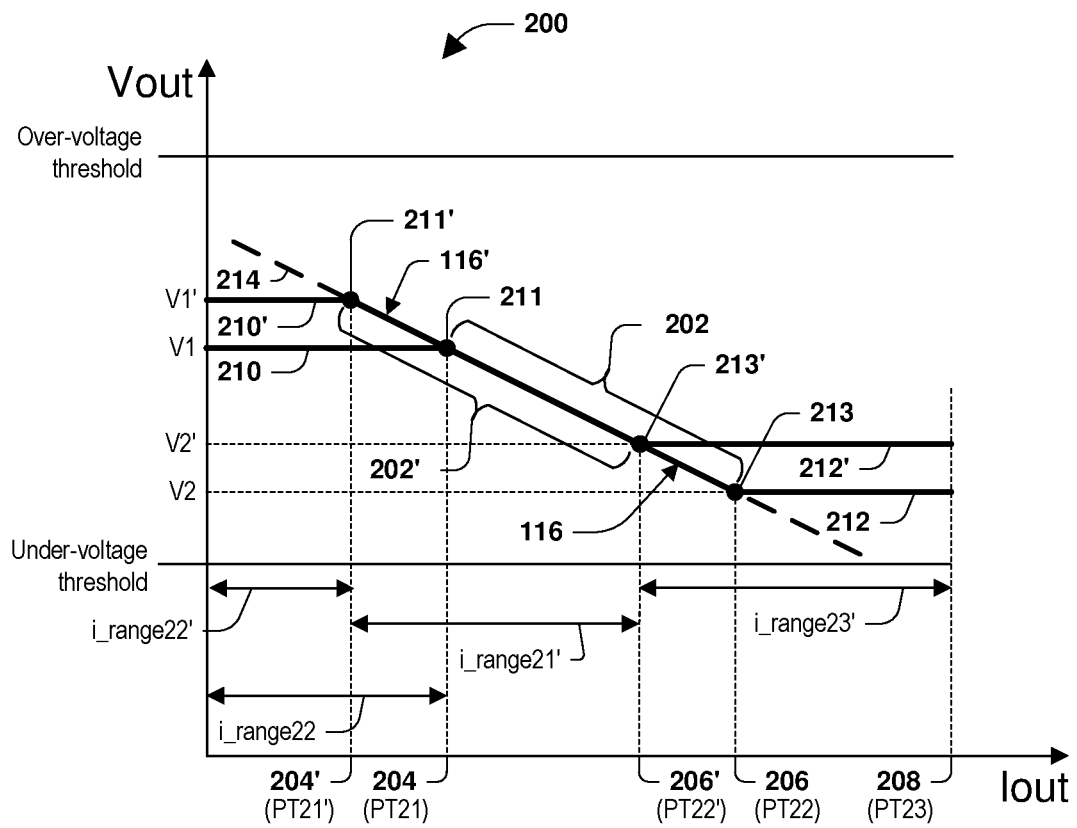

FIG. 2B illustrates the graph 200 of the load-line 116 as a dynamic non-linear load-line, according to some embodiments. In this case, first threshold 204 and the second threshold 206 of the output current Iout change in response to programmable changes of the first voltage value V1 and the second voltage value V2. The first output voltage value is programmed to change from V1 to V1' and the second voltage value is programmed to change from V2 to V2'. The first portion 202 of the load-line 116 changes to a first portion 202' along a slope line 214 of the graph 200. In other words, the slope S21 of the first portion 202 of the load-line 116 does not change. As illustrated in FIG. 2B, all changed reference numbers and values are referenced by the prime symbol ('). Thus, as the load current Iout of the load 102 changes between the first current range i_range21', the second current range i_range22', and the third current range i_range23', the controller 108 controls the power converter 104 to output the output voltage Vout along the load-line 116 corresponding to the first portion 202', the second portion 210', and the third portion 212'. According to various examples, the first voltage value V1 and the second voltage value V2 may be programmed to increase or decrease. The first voltage value V1 and the second voltage value V2 may be programmed to change individually or collectively. Likewise, the slope S21 of the first portion 202, the slope S22 of the second portion 210, and the slope S23 of the third portion 212 may each be programmed to change (e.g., programmed into corresponding registers of the controller 108). When the load-line 116 is configured as a dynamic non-linear load-line, the controller 108 may provide changes thereto in response to operating conditions of the load, such as temperature. Other arrangements and/or configurations of the load-line 116 configured as a dynamic non-linear load-line are within the scope of the present disclosure.

Figure 2C:
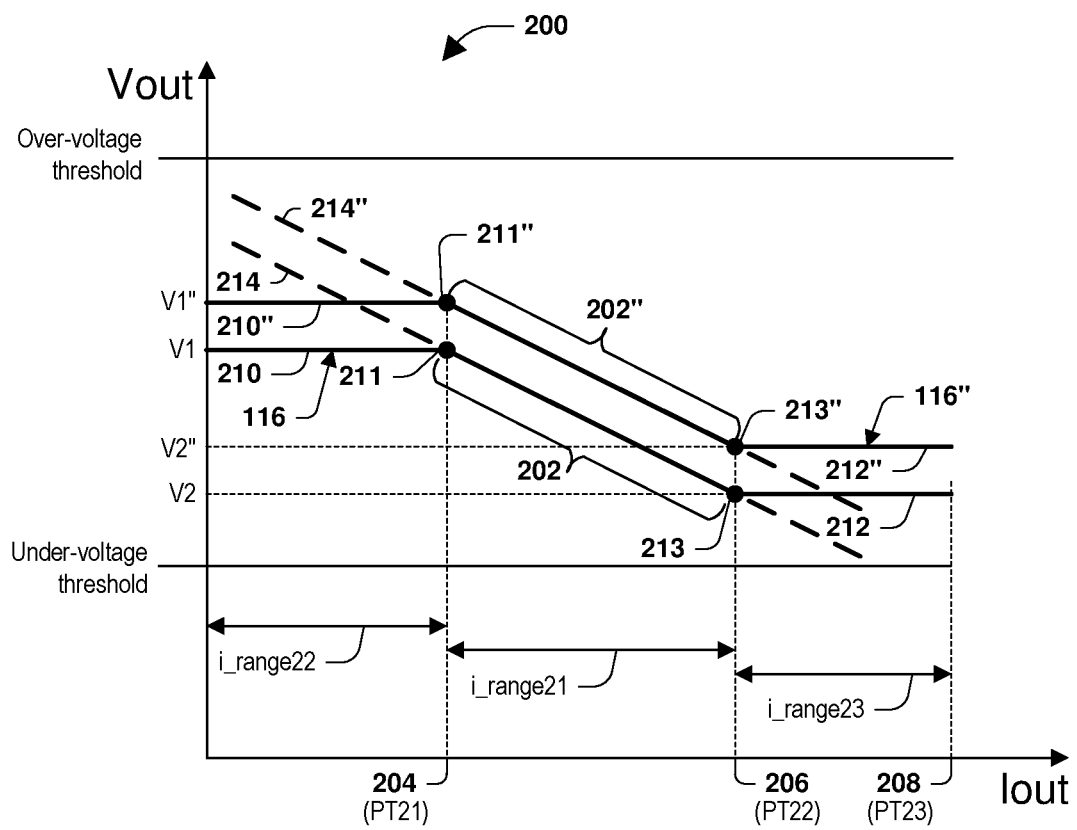

FIG. 2C illustrates the graph 200 of the load-line 116 as a dynamic non-linear load-line, according to some embodiments. In this case, the first threshold 204 and the second threshold 206 of the output current Iout do not change in response to programmable changes of the first voltage value V1 and the second voltage value V2. The first output voltage value is programmed to change from V1 to V1" and the second voltage value is programmed to change from V2 to V2". The slope line 214 changes to slope line 214" and the first portion 202 of the load-line 116 changes to a first portion 202" along the slope line 214". In other words, while the slope line 214 changes, the slope S21 of the first portion 202 of the load-line 116 itself does not change. As illustrated in FIG. 2C, all changed reference numbers and values are referenced by the double prime symbol ("). Thus, as the load current Iout of the load 102 changes between the first current range i_range21, the second current range i_range22, and the third current range i_range23, the controller 108 controls the power converter 104 to output the output voltage Vout along the load-line 116" corresponding to the first portion 202", the second portion 210", and the third portion 212". According to various examples, the first voltage value V1 and the second voltage value V2 may be programmed to increase or decrease. The first voltage value V1 and the second voltage value V2 may be programmed to change individually or collectively. Likewise, the slope S21 of the first portion 202, the slope S22 of the second portion 210, and the slope S23 of the third portion 212 may each be programmed to change (e.g., programmed into corresponding registers of the controller 108). When the load-line 116 is configured as a dynamic non-linear load-line, the controller 108 may provide changes thereto in response to operating conditions of the load, such as temperature. According to yet another embodiment, the load-line 116 is a dynamic non-linear load-line such that programmable changes to the first threshold 204 and the second threshold 206 correspond to programmable changes of the first voltage value V1 and the second voltage value V2. In other words, the first portion 202 of the load-line 116 changes vertically and/or horizontally along the Iout axis and the Vout axis of the graph 200. In this case, the slope S21 of the first portion 202 of the load-line 116 may or may not change. Other arrangements and/or configurations of changes to the load-line 116 are within the scope of the present disclosure.

According to some embodiments, the first slope S21 has a fixed value, the first threshold 204 is a first programmable threshold, and the second threshold 206 is a second programmable threshold. The load current Iout of the load 102 as indicated by the current information Imon may quickly change. The power converter 104 adjusts the output voltage Vout in response to the change in load current Iout indicated by the current information Imon to follow the load-line 116. According to an example of a network/packet processor as the load 102, the load current Iout quickly changes from an idle current to a processing current when the load 102 changes between the idle state and the processing state. Because the power converter 104 adjusts the output voltage Vout in response to the load current Iout along the load-line 116, the output voltage Vout transitions between portions of the load-line 116 (e.g., the first portion 202, the second portion 210, and the third portion 212). According to an example, it is desirable to maintain the output voltage Vout along the first portion 202 of the load-line 116 and reduce transitions to the second portion 210 of the load-line 116 or the third portion 212 of the load-line 116. A reduction in transitions between portions of the load-line 116 provides increased system performance, such as a smoother output voltage Vout, and a reduction in transient effects, such as system noise.

A historic load current of the load 102 corresponds to an operating temperature of the load 102. The operating temperature of the load 102 is provided by the temperature value, which is indicated by the temperature signal Tsig. The load current Iout itself may also change in response to operating temperature of the load 102. According to an example of a network/packet processor as the load 102, if the load 102 is idle (e.g., in the idle state) or is not repeatedly engaged, the operating temperature of the load 102 will be lower, such as ambient operating temperature. However, if the load 102 is repeatedly and/or continually engaged (e.g., in the processing state), the operating temperature of the load 102 will increase. Likewise, if the load 102 fluctuates between the idle state and the processing state the operating temperature of the load 102 will correspond to the level of engagement of the load 102. The operating temperature of the load 102 is communicated by way of the temperature signal Tsig.

According to some embodiments, the thresholds of the load-line 116 (e.g., the first threshold 204 and the second threshold 206) are changed, or are programmed to change, in response to the temperature value, which is indicated by the temperature signal Tsig. The thresholds are changed such that the power converter 104 provides the output voltage Vout along the first portion 202 of the load-line 116 for a greater period of time during continuous operation. In an example of the network/packet processor as the load 102, a lower temperature value, which is indicated by the temperature signal Tsig, indicates that the load 102 has consumed less historic load current in a historic operational state (e.g., the idle state or an operational state with little or no packet traffic). A higher temperature value, which is indicated by the temperature signal Tsig, indicates that the load 102 has consumed greater historic load current in the historic operational state (e.g., the processing state when processing a greater amount of packet traffic). According to an example, the load 102 consumes an idle load current Iout of 200 A, which is below the first load current value PT21 of the first threshold 204. During processing, the load 102 consumes a processing load current Iout of 1000 A or 1200 A, which is greater than the second load current value PT22 of the second threshold 206. The load current Iout may change rapidly, and rise to 1200 A on the order of 500 ns causing a transition from the second portion 210 of the load-line 116 to the first portion 202 of the load-line 116. If the temperature value, which is indicated by the temperature signal Tsig, indicates that the load 102 has consumed greater historic load current, the first threshold 204 and the second threshold 206 of the load-line 116 are then changed or are programmed to change such that the power converter 104 provides the output voltage Vout along the first portion 202 of the load-line 116.

According to another example of the network/packet processor as the load 102, the idle load current Iout itself may change in response to temperature of the load 102. For example, during extended idle operation, the load 102 may have a lower temperature and consume an idle load current Iout of 200 A. During light operation, the load 102 may increase in temperature, and the idle load current Iout may slightly increase, such as to 220 A, 240 A, or 280 A. During periodic processing of packet traffic according to anticipated design traffic, the load 102 may increase in temperature and have an idle load current Iout of 400 A. During extended and/or continuous processing of packet traffic, the load 102 may further increase in temperature and have an idle load current Iout greater than 400 A, such as 500 A, 600 A, or above. The first threshold 204 and the second threshold 206 of the load-line 116 are then changed or are programmed to change in response to the temperature value, which is indicated by the temperature signal Tsig, such that the power converter 104 provides the output voltage Vout along the first portion 202 of the load-line 116. Other arrangements and/or configurations of the first threshold 204 or the second threshold 206 with respect to the temperature value are within the scope of the present disclosure.

According to some embodiments, in the case of a network/packet processor as the load 102, the load current Iout is maintained within the first portion 202 of the load-line 116 to at least one of reduce the transient effects or minimize a response to the transient effects by the output voltage Vout. The transient effects are associated with transition of the load current Iout from the first portion 202 of the load-line 116 to the second portion 210 of the load-line 116 or the third portion 212 of the load-line 116. The output voltage Vout may ripple in response to the transient effects, which may in turn propagate additional transient effects in the electronic system 100. For example, with an idle load current Iout of 200 A, the first threshold 204 of load-line 116 is programmed to 200 A to maintain the load current Iout within the first portion 202 of load-line 116 and to conserve power. With an increase in temperature of the load 102 (e.g., due to periodic packet traffic), the idle current Iout increases to 400 A. The first threshold 204 is then changed or programmed to change to 400 A to maintain the load current Iout within the first portion 202 of the load-line 116 and improve system performance. According to some embodiments, the second threshold 206 changes or is programmed to change with the first threshold 204 such that the slope S21 of the first portion 202 of the load-line 116 is maintained. In another example, the first threshold 204 and the second threshold 206 are programmed on-the-fly to at least one of increase the system performance, reduce the transient effects, or minimize a response to the transient effects by the output voltage Vout.

According to some embodiments, the transient effects include or exacerbate switching noises in computing environments, such as switch-mode power supplies, memory buses (e.g., Double Data Rate (DDR) memory buses), other high-speed buses, etc. In some embodiments, reducing the transient effects or minimizing a response to the transient effects by the output voltage Vout improves long-term reliability of systems or components due to overheating. In some embodiments, reducing the transient effects or minimizing a response to the transient effects by the output voltage Vout improves system performance over time. For example, in a laptop or a battery computing environment, system reliability is improved by avoiding or reducing a potential for battery thermal runaway. In another example, as silicon geometry processes are lowered to 14 nm, 10 nm, 7 nm, or below, a processor or ASIC as the load 102 includes a substrate, which may negatively respond or degrade in response to the transient effects. Reducing the transient effects or minimizing a response to the transient effects by the output voltage Vout improves reliability of systems and/or components as the load 102.

According to some embodiments with a network/packet processor as the load 102, the over-voltage threshold is 0.90 V and the under-voltage threshold is 0.65 V. The first threshold 204 is initially set to 200 A with a corresponding first voltage value V1 of 0.8 V and the second threshold 206 is initially set to 1000 A with a corresponding second voltage value V2 of 0.72 V. The first voltage value V1 of 0.8 V is provided for the second portion 210 of the load-line 116 and the second voltage value V2 of 0.72 V is provided for the third portion of 212 of the load-line 116. The first portion 202 of the load-line 116 has a fixed first slope S21 (e.g., corresponding to 0.1 milliohms (mΩ)). In a condition where the load current Iout reaches the second threshold 206 of 1000 A, the load current Iout is disabled. The first threshold 204 and the second threshold 206 are operative to change in response to the temperature value, which is indicated by the temperature signal Tsig, by the controller 108. If the temperature value indicates that the load 102 is drawing an increase in historic load current, the first threshold 204 and the second threshold 206 are then programmed to change and the first slope S21 does not change (e.g., corresponding to 0.1 mΩ). In this example, the first threshold 204 is dynamically programmed to change (e.g., to 400 A) and the second threshold 206 is dynamically programmed to change (e.g., to 1200 A). The first portion 202 of the load-line 116 has the same first slope S21 (e.g., corresponding to 0.1 mΩ) and the power converter 104 maintains the output voltage Vout along the first portion 202 of the load-line 116. In this embodiment, the load current Iout may then reach the second threshold 206 of 1200 A before the load current Iout is disabled, which reduces transient effects of transition between the first portion 202 and the third portion 212 of the load-line 116.

According to some embodiments with a network/packet processor as the load 102, the first threshold 204 is set to 400 A with a corresponding first voltage value V1 of 0.8 V and the second threshold 206 is set to 1200 A with a corresponding second voltage value V2 of 0.7 V. The first voltage value V1 of 0.8 V is provided for the for the second portion 210 of the load-line 116 and the second voltage value V2 of 0.7 V is provided for the third portion 212 of the load-line 116. The first portion 202 of the load-line 116 has a fixed first slope S1 (e.g., corresponding to 0.16 mΩ). In a condition where the load current Iout reaches the second threshold 206 of 1200 A, the load current Iout is disabled. The first threshold 204 and the second threshold 206 are operative to change in response to the temperature value, which is indicated by the temperature signal Tsig, by the controller 108. If the temperature value indicates that the load 102 is drawing a decrease in historic load current the first threshold 204 and the second threshold 206 are then programmed to change while the first slope S21 does not change (e.g., corresponding to 0.16 mΩ). In this example, the first threshold 204 is dynamically programmed to change (e.g., to 400 A) and the second threshold 206 116 is dynamically programmed to change (e.g., to 1000 A). The first portion 202 of the load-line 116 has the same first slope S21 (e.g., corresponding to 0.16 mΩ) and the power converter 104 maintains the output voltage Vout along the first portion 202 of the load-line 116.

Figure 2D:
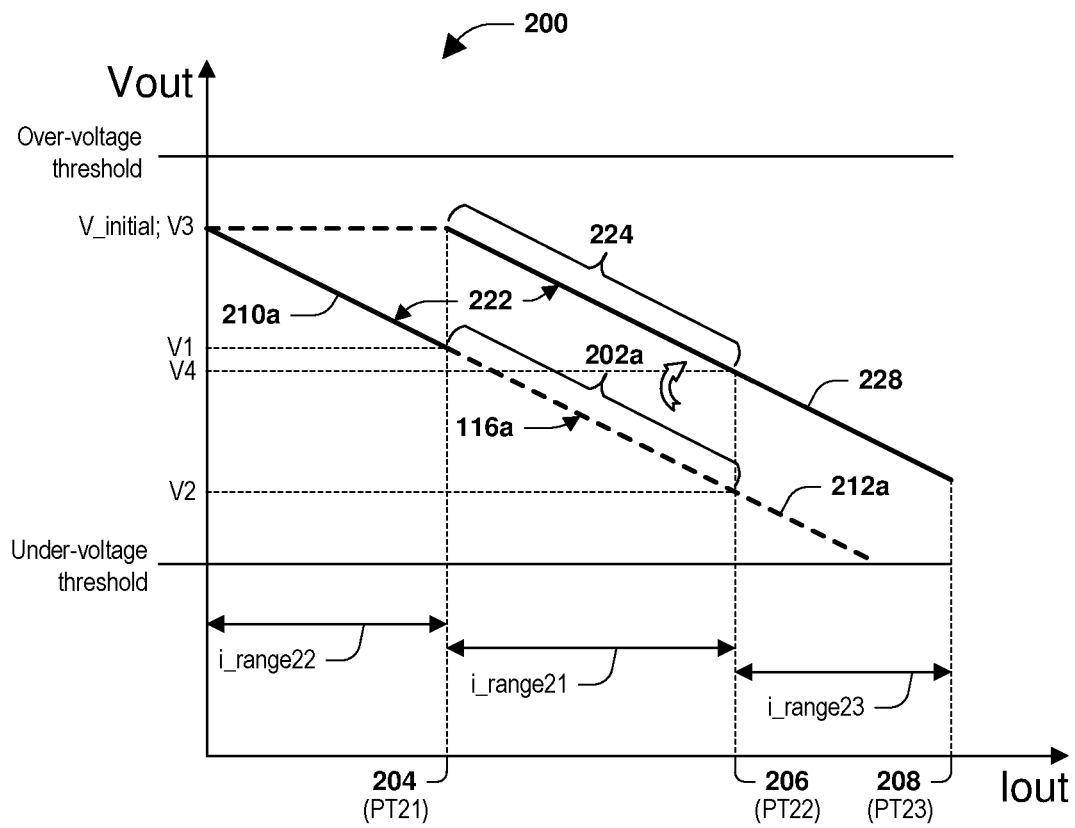

FIG. 2D illustrates the graph 200 of a static load-line 116a changed to a dynamic load-line 222 to control the power converter 104 to output the output voltage Vout as a function of the load current Iout, according to some embodiments. The controller 108 is a digital multi-phase controller or an analog multi-phase controller to control the power converter 104 in response to the static load-line 116a or the dynamic load-line 222. The static load-line 116a is a static load-line having a first portion 202a corresponding to the first current range i_range21, a second portion 210a corresponding to the second current range i_range22, and a third portion 212a corresponding to the third current range i_range23. The static load-line 116a has the slope S21, which is the same as the slope S21 of the first portion 202 of the load-line 116 of FIG. 2A. The controller 108 controls the power converter 104 to produce the output voltage Vout along the static load-line 116a to be less than an over-voltage threshold and greater than an under-voltage threshold. The static load-line 116a does not correspond to a full operational current range of the load 102 (e.g., a combination of the first current range i_range21, the second current range i_range22, the third current range i_range23). Because the third portion 212a of the static load-line 116a intersects the under-voltage threshold, the controller 108 controls the power converter 104 to disable the load current Iout if the load current Iout exceeds the second threshold 206. In this embodiment, the static load-line 116a does not correspond to a full operational voltage range of the load 102 (e.g., between the over-voltage threshold and the under-voltage threshold). In other words, the static load-line 116a does not provide the output voltage Vout in response to the load current Iout in the full operational current range and the full operational voltage range of the load 102.

The controller 108 includes the circuitry 114, which is operative to respond to the temperature value, which is indicated by the temperature signal Tsig, received by the interface 112 to change the static load-line 116a into the dynamic load-line 222. The dynamic load-line 222 is a non-linear load-line. According to an embodiment, the dynamic load-line 222 includes a first portion 224 and the second portion 210a of the static load-line 116a. According to an embodiment, the dynamic load-line 222 includes the first portion 224 and a second portion 226. According to another embodiment, the dynamic load-line 222 includes a third portion 228 and at least one of the second portion 226 or the second portion 210a of the static load-line 116a.

The power converter 104 begins voltage regulation at an initial output voltage (V_initial) and follows the static load-line 116a along the second portion 210a of the static load-line 116a based on the current information Imon received by the controller 108. The first portion 202a of the static load-line 116a is the same as the first portion 202 of the load-line 116 illustrated in FIG. 2A with the corresponding first voltage value V1 and the corresponding second voltage value V2. The controller 108 responds to the temperature value, which is indicated by the temperature signal Tsig, to change the first portion 202a of the static load-line 116a to a first portion 224 of the dynamic load-line 222 (e.g., in the first current range i_range21 between the first threshold 204 and the second threshold 206). The first portion 224 of the dynamic load-line 222 has the slope S21. The first portion 224 of the dynamic load-line 222 corresponds to a third voltage value V3 and a fourth voltage value V4. According to an embodiment, the third voltage value V3 is the same as the initial voltage V_initial. According to another embodiment, the third voltage value V3 is a voltage above the first voltage value V1 and below the over-voltage threshold.

According to an embodiment, at the first threshold 204, the circuitry 114 responds to the temperature value, which is indicated by the temperature signal Tsig, such that the output voltage Vout is pulsed to change from the first voltage value V1 to the third voltage value V3 (e.g., at the beginning of the first current range i_range21). According to another embodiment, the output voltage Vout is pulsed to change the initial voltage V_initial to the third voltage value V3 in the second current range i_range22 (e.g., to maintain the initial voltage V_initial at the third voltage value V3 when the initial voltage V_initial is the same as the third voltage value V3). The output voltage Vout is pulsed at the first threshold 204, such that the output voltage Vout follows the first portion 224 of the dynamic load-line 222, which has the same slope S21 as the first portion 202a of the static load-line 116a. According to an example, the dynamic load-line 222 retains the second portion 210a of the static load-line 116a corresponding to the second current range i_range22. According to another example, the dynamic load-line 222 includes the second portion 226 corresponding to the second current range i_range22.

According to an embodiment, when the circuitry 114 is operative to respond to the temperature value, which is indicated by the temperature signal Tsig, the second threshold 206 is changed to the third threshold 208. The controller 108 then controls the power converter 104 to disable the load current Iout if the load current Iout exceeds the third threshold 208. In this embodiment, the third portion 212a of the static load-line 116a is changed to the third portion 228 of the dynamic load-line 222. The static load-line 116a is changed to the dynamic load-line 222 in the first current range i_range21, the second current range i_range22, and the third current range i_range23. The dynamic load-line 222 provides the output voltage Vout in response to the load current Iout in the full operational current range and the full operational voltage range of the load 102. Other arrangements and/or configurations to change the static load-line 116a to the dynamic load-line 222 are within the scope of the present disclosure.

Figure 3:
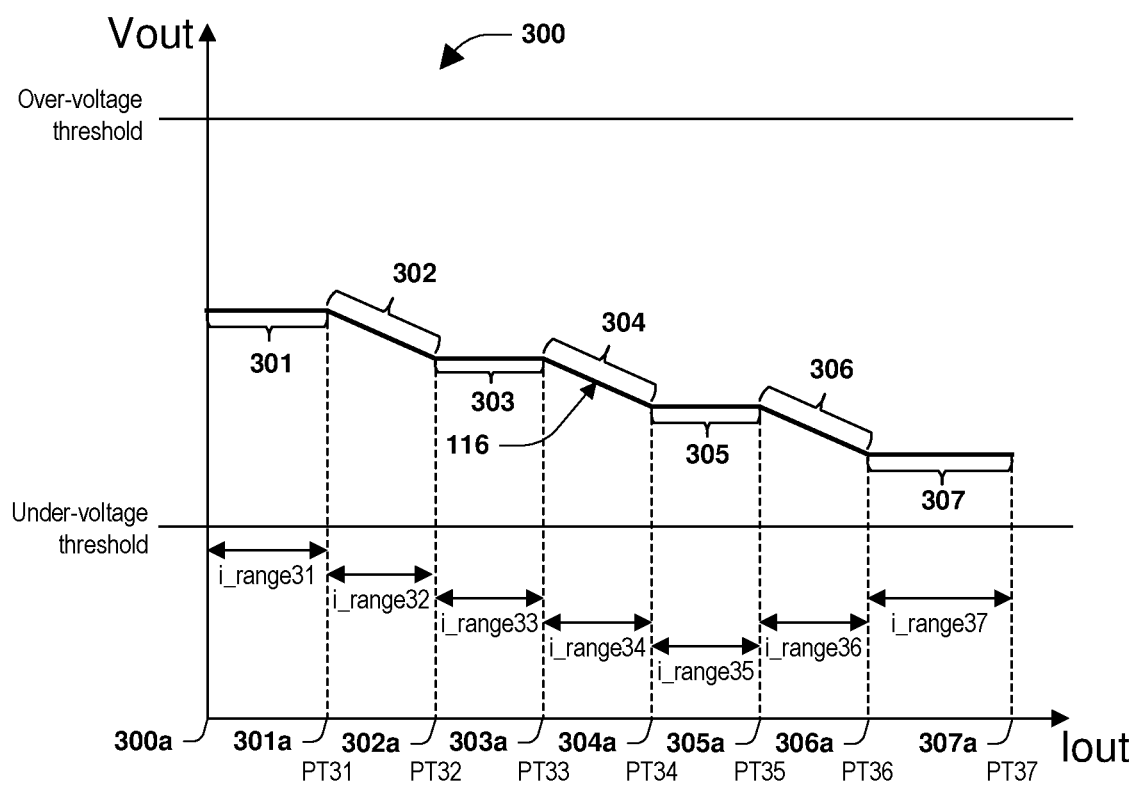
FIG. 3 illustrates a graph of a load-line with an output voltage for a power converter provided as a function of a load current, according to some embodiments.

FIG. 3 illustrates a graph 300 of the load-line 116 with the output voltage Vout for the power converter 104 provided as a function of the load current Iout, according to some embodiments. The controller 108 is a digital multi-phase controller with a load-line 116 operative as a programmable non-linear load-line. The controller 108 controls the power converter 104 to produce the output voltage Vout along the load-line 116 to be less than an over-voltage threshold and greater than an under-voltage threshold. The controller 108 includes the circuitry 114 operative to adjust the load-line 116 in response to the temperature signal Tsig received by the interface 112.

The load-line 116 comprises a first portion 301 having a first slope S31 that determines a rate of change of the output voltage Vout as a function of the rate of change of the load current Iout. The first slope S31 of the first portion 301 is provided according to equation 1, set forth above. The first portion 301 of the load-line 116 is implemented by the controller 108 when the load current Iout is within a first current range i_range31 between an initial load current 300a and a first threshold 301a. The first threshold 301a has a first load current value PT31. According to an example, the first slope S31 is a zero slope or a substantially zero slope wherein the output voltage Vout changes at least one of less than five percent, less than three percent, or less than one percent.

The load-line 116 comprises a second portion 302 having a second slope S32 that determines a rate of change of the output voltage Vout as a function of a rate of change of the load current Iout. The second slope S32 of the second portion 302 is provided according to equation 1, set forth above. The second portion 302 of the load-line 116 is implemented by the controller 108 when the load current Iout is within a second current range i_range32. The second current range i_range32 is between the first threshold 301a and a second threshold 302a. The first threshold 301a has a first load current value PT31 and the second threshold 302a has a second load current value PT32. According to an example, the second slope S32 is a non-zero slope.

The load-line 116 comprises a third portion 303 having a third slope S33, a fifth portion 305 having a fifth slope S35, and a seventh portion 307 having a seventh slope S37. The third slope S33, the fifth slope S35, and the seventh slope S37 each determine a rate of change of the output voltage Vout as a function of a rate of change of the load current Iout. The third slope S33, the fifth slope S35, and the seventh slope S37 are each provided according to equation 1, set forth above. According to an example, the third slope S33, the fifth slope S35, and the seventh slope S37 have a zero slope or a substantially zero slope wherein the voltage changes at least one of less than five percent, less than three percent, or less than one percent. According to another example, the third slope S33, the fifth slope S35, and the seventh slope S37 have a non-zero slope.

The third portion 303 of the load-line 116 is implemented when the load current Iout is within a third current range i_range33. The third current range i_range33 is between the second threshold 302a and a third threshold 303a. The third threshold 303a has a third load current value PT33. The fifth portion 305 of the load-line 116 is implemented when the load current Iout is within a fifth current range i_range35. The fifth current range i_range35 is between a fourth threshold 304a and a fifth threshold 305a. The fourth threshold 304a has a fourth load current value PT34 and the fifth threshold 305a has a fifth load current value PT35. The seventh portion 307 is implemented when the load current Iout is within a seventh current range i_range37. The seventh current range i_range37 is between a sixth threshold 306a and a seventh threshold 307a. The sixth threshold 306a has a sixth load current value PT36 and the seventh threshold 307a has a seventh load current value PT37. According to an example, the sixth threshold 306a is a maximum load current Iout output by the power converter 104. If load current Iout exceeds the sixth threshold 306a, the controller 108 controls the power converter 104 to disable the load current Iout. According to another example, the seventh threshold 307a is a maximum load current Iout output by the power converter 104. The seventh load current value PT37 corresponds to a maximum design current for the load 102, and the controller 108 controls the power converter 104 to isolate the load current Iout from the load 102. Isolation of the load current Iout from the load 102 is provided, for example, by an isolation unit (not shown), such as a gate, a high current tristate buffer gate, etc.

The load-line 116 comprises a fourth portion 304 having a fourth slope S34 and a sixth portion 306 having a sixth slope S36. The fourth portion 304 and the sixth portion 306 each determine a rate of change of the output voltage Vout as a function of a rate of change of the load current Iout. The fourth slope S34 and the sixth slope S36 are each provided according to equation 1, set forth above. According to an example, the fourth slope S34 and the sixth slope S36 have a non-zero slope. The fourth portion 304 is implemented when the load current Iout is within a fourth current range i_range34. The fourth current range i_range34 is between the third threshold 303a and the fourth threshold 304a. The sixth portion 306 is implemented when the load current Iout is within a sixth current range i_range36. The sixth current range i_range36 is between the fifth threshold 305a and the sixth threshold 306a. In view of the above, the second current range i_range32 is greater than the first current range i_range31, the third current i_range33 is greater than the fourth current range i_range34, the fourth current range i_range34 is greater than the fifth current range i_range35, the sixth current range i_range36 is greater than the fifth current range, and the seventh current range i_range37 is greater than the sixth current range i_range36.

According to an example, the load-line 116 has a plurality of portions that have a zero slope or a substantially zero slope (e.g., the first portion 301, the third portion 303, the fifth portion 305, and the seventh portion 307) and a plurality of portions that have a non-zero slope (e.g., the second portion 302, the fourth portion 304, and the sixth portion 306). The portions that have a zero slope or a substantially zero slope are at least one of contiguous or interleaved with the portions that have a non-zero slope.

According to some embodiments, each of the thresholds of the load-line 116 (e.g., 301a, 302a, 303a, 304a, 305a, 306a, 307a) is a programmable threshold, and each of the slopes (e.g., S31, S32, S33, S34, S35, S36, S37) corresponding to each of the portions (e.g., 301, 302, 303, 304, 305, 306, and 307) of the load-line 116 has a fixed value. According to an example, each of the slopes corresponding to each of the portions has the same fixed value. According to another example, each of the slopes corresponding to each of the portions has a different fixed value. According to another example, each of the slopes corresponding to each of the portions has a programmable value that is programmed according to the thresholds bordering each of the portions. The load current Iout of the load 102 as indicated by the current information Imon may quickly change between the portions of the load-line 116. The power converter 104 adjusts the load current Iout in response to the change indicated by the current information Imon to follow the load-line 116. It is desirable to maintain the output voltage Vout along portions of the load-line 116 and reduce transitions between portions. The circuitry 114 of the controller 108 is operative to change or dynamically change the thresholds of the load-line 116 in response to an input signal received at the interface 112 of the controller 108. For example, the input signal may be the current information Imon indicating a power stage of the plurality of power stages 105 in operation. In another example, the input signal may be the temperature signal Tsig indicating that the power converter 104 is operating in one or more of the current ranges of the load current Iout (e.g., i_range31, i_range32, i_range33, i_range34, i_range35, i_range36, or i_range37). The circuitry 114 of the controller 108 is operative to change or dynamically change the thresholds of the load-line 116 in response to the input signal to reduce transitions between portions of the load-line 116. The circuitry 114 of the controller 108 is operative to change or dynamically change the thresholds of the load-line 116 in response to the input signal to reduce transitions between zero slope portions of the load-line 116 (e.g., 310, 303, 305, and 37) and non-zero slope portions of the load-line 116 (e.g., 302, 304, and 306). The circuitry 114 of the controller 108 is operative to change or dynamically change a number of the thresholds of the load-line 116, a number of the portions of the load-line 116, a number of the portions of the load-line 116 having a zero or substantially zero slope, or a number of the portions of the load-line 116 having a non-zero slope. The circuitry 114 of the controller 108 is operative to change or dynamically change the portions of the load-line 116 to reduce and/or eliminate the zero slope or substantially zero slope portions of the load-line 116 (e.g., 310, 303, 305, and 37) such that the load-line 116 includes only includes non-zero slope portions (e.g., 302, 304, and 306). According to an example, reduction and/or elimination of the zero slope or substantially zero slope portions of the load-line 116 provides a reduction and/or elimination of transitions to the zero slope or substantially zero slope portions of the load-line 116 and provides increased system performance, such as a smoother output voltage Vout, and a reduction in transient effects, such as system noise. Other configurations and/or arrangements of the thresholds of the load-line 116 and the input signal are within the scope of the present disclosure.

Figure 4:
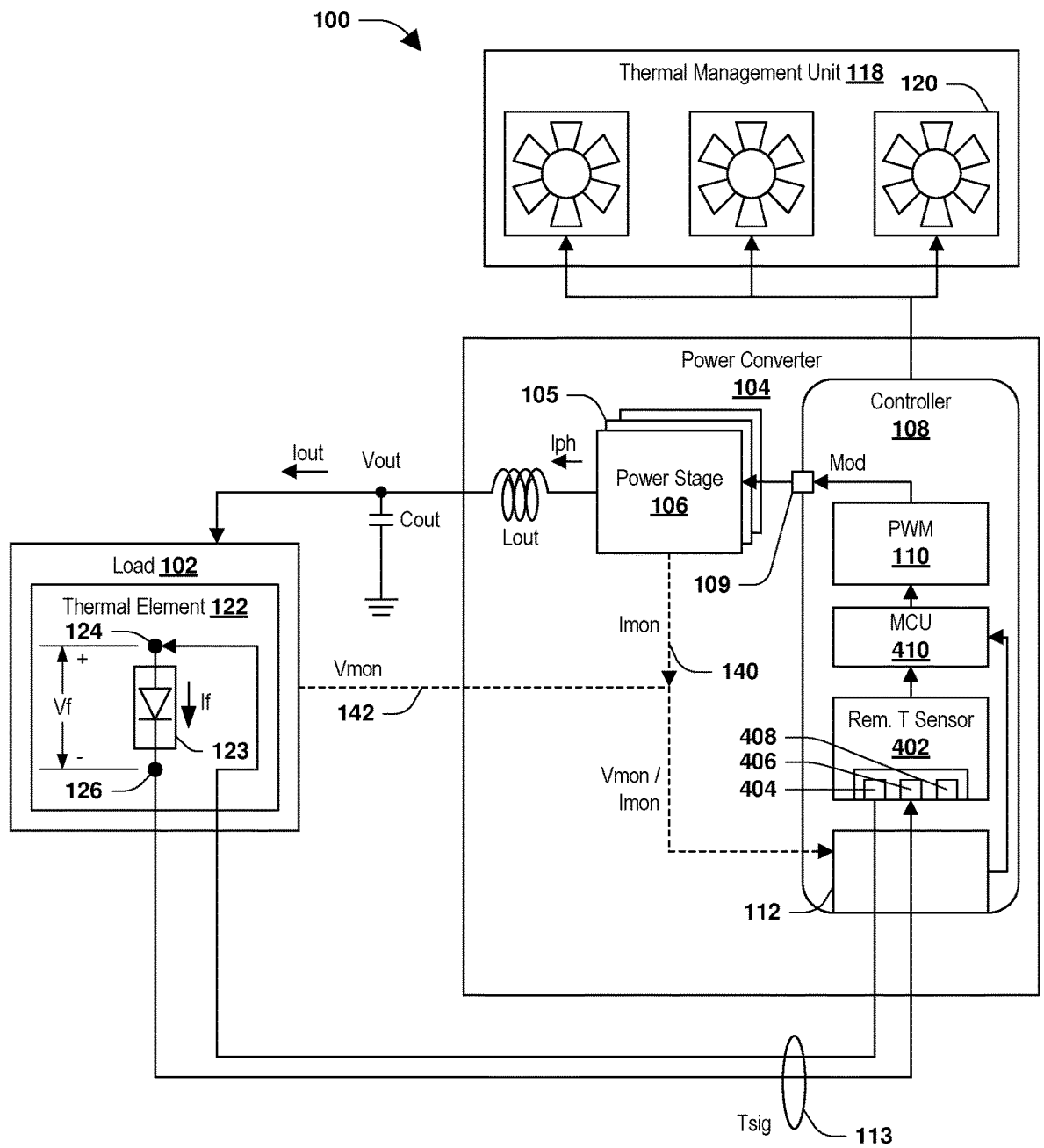
FIG. 4 illustrates an electronic system including a load and a power converter 104, according to some embodiments.

FIG. 4 illustrates the electronic system 100 including the load 102 and the power converter 104, according to some embodiments. The power converter 104 is operative to regulate the output voltage (Vout) provided to the load 102. The controller 108 is a digital multi-phase controller with a programmable non-linear load-line. The controller 108 comprises a remote temperature sensor 402, including a first terminal 404 coupled to the first node 124 of the thermal element 122 and a second terminal 406 coupled to the second node 126 of the thermal element 122 by way of the first communication bus 113. According to the illustrated example, the thermal element 122 is configured as the thermal diode 123 of FIG. 1B. According to various examples, the thermal element 122 may be configured in other forms (e.g., the substrate transistor 144 illustrated in FIG. 10, the examples illustrated in FIGS. 1D-1I, or another example). In an example, the first terminal 404 is a positive voltage terminal that provides the forward current If to the first node 124. The second terminal is a negative voltage reference terminal that receive the forward current If from the second node 126. The remote temperature sensor 402 also includes a third terminal 408 for connecting various configurations of the thermal element 122 along first communication bus 113. For example, the third terminal 408 may provide a ground connection for the transistor 168 of FIG. 1F or the transistor 180 of FIG. 1G. A change in voltage across the thermal element 122 corresponds to a change in temperature of the load 102 and is communicated by way of temperature signal Tsig to the controller 108 along the first communication bus 113.

The remote temperature sensor 402 receives the temperature signal Tsig, which corresponds to voltage measurements across the thermal element 122. The remote temperature sensor 402 communicates the temperature value, which is indicated by the temperature signal Tsig, to a micro-control unit 410. The micro-control unit 410 receives the current information Imon from the interface 112 and the temperature value from the remote temperature sensor 402. According to an embodiment of the network/packet processor as the load 102, the first threshold 204 and the second threshold 206 of the load-line 116 are set to initially engage the first portion 202 of the load-line 116 based upon an anticipated load current Iout of the load 102 as illustrated in FIG. 2A. It is desirable to engage the first portion 202 of the load-line 116 when the load 102 is idle or processing packet traffic such that the power converter 104 operates in the first current range i_range21. It is desirable that the first load current value PT21 of the first threshold 204 is set below the idle load current consumed by the load 102, which may be different than the load current Iout indicated by the current information Imon. For example, the first load current value PT21 of the first threshold 204 may correspond to 200 A, which corresponds to the idle load current of the load 102. The temperature value may indicate that the historic load current consumed by the load 102 is greater than the first load current value PT21 of 200 A. The micro-control unit 410 adjusts the first threshold 204 to engage the first portion 202 of the load-line 116 at the first load current value PT21 during the idle load current of the load 102. The first portion 202 of the load-line 116 has a fixed slope S21 and the micro-control unit 410 adjusts the second load current value PT22 to maintain the fixed slope S21. When the load 102 is processing packet traffic and the load current Iout quickly increases, the first portion 202 of the load-line 116 is engaged such that the load current Iout does not transition between the second portion 210 of the load-line 116 and the first portion 202 of the load-line. Other changes to the thresholds of load-line 116 are within the scope of the present disclosure.

According to another example of a multi-phase buck converter, the modulation signal Mod controls the phase current Iph of each power stage of the plurality of power stages 105 so as to regulate the output voltage Vout provided to the load 102. The current information Imon may indicate a load current Iout of a current range, such as second current range i_range32 (corresponding to the first threshold 301a and the second threshold 302a) as illustrated in FIG. 3. The temperature value may indicate that the load 102 is drawing a load current corresponding to another current range, such as the fourth current range i_range34. The micro-control unit 410 then changes the first threshold 301a and the second threshold 302a to the third threshold 303a and the fourth threshold 304a such that the power converter 104 follows the fourth portion 304 of the load-line 116. According to an example, the micro-control unit 410 changes other thresholds of the load-line 116 illustrated in FIG. 3 (e.g., 301a, 302a, 303a, 304a, 305a, and 306a) as indicated by the current information Imon and the temperature value so as to regulate the output voltage Vout provided to the load 102. Other changes to the thresholds of load-line 116 are within the scope of the present disclosure.

According to another example of a multi-phase buck converter, the load 102 may experience periodic operation along two portions of the load-line 116, such as a non-zero portion of the load-line 116 and a zero or substantially zero portion of the load-line 116, as illustrated in FIG. 3. The current information Imon may indicate a load current Iout indicating two current ranges, such as the third current range i_range33 along the third portion 303 of the load-line 116 and the fourth current range i_range34 along the fourth portion 304 of the load-line 116. The two current ranges are between the second threshold 302a and the fourth threshold 304a. The temperature value may indicate that load 102 is drawing a historic load current greater than indicated by the current information Imon, such as the fifth current range i_range35 corresponding to the fifth portion 305 of the load-line 116 and the sixth current range i_range36 corresponding to the sixth portion 306 of the load-line 116. The micro-control unit 410 then changes the second threshold 302a and the fourth threshold 304a to the fifth threshold 305a and the sixth threshold 306a such that the power converter 104 operates along the fifth portion 305 and the sixth portion 306 of the load-line 116. The micro-control unit 410 changes the thresholds to correspond to two portions of the load-line 116 as indicated by the current information Imon and the temperature value so as to regulate the output voltage Vout provided to the load 102. Other changes to the thresholds of load-line 116 are within the scope of the present disclosure.

Figure 5:
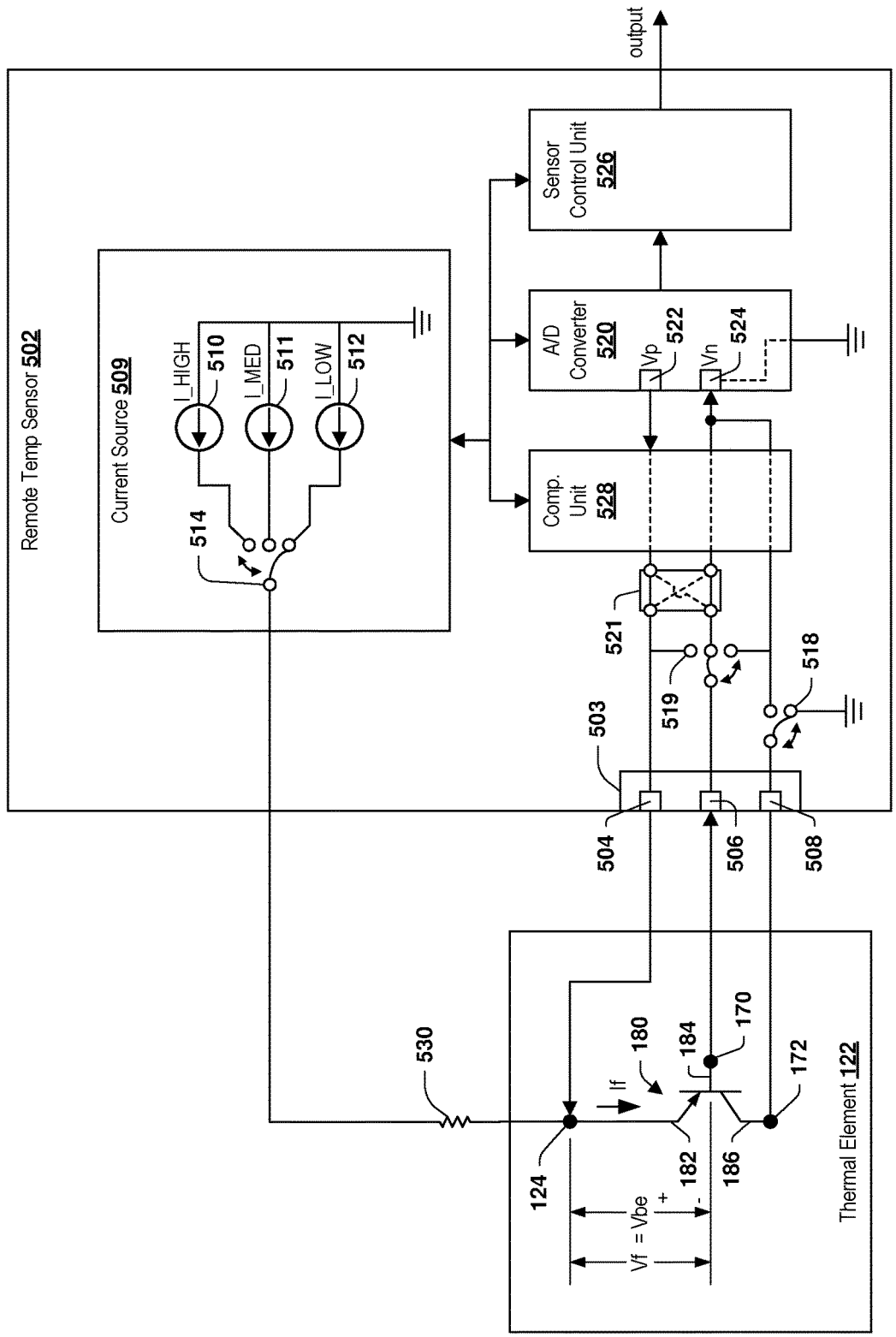
FIG. 5 illustrates a remote temperature sensor connected to a thermal element, according to some embodiments.

FIG. 5 illustrates a remote temperature sensor 502 connected to the thermal element 122, according to some embodiments. In an embodiment, the remote temperature sensor 502 is operative to function as the remote temperature sensor 402 in the controller 108 illustrated in FIG. 4 or the circuitry 114 illustrated in FIG. 2. In another embodiment, the remote temperature sensor 502 is an independent circuit element (e.g., connected to a separate controller in a printed circuit board (PCB)). Many processors and ASICs include the thermal element 122 in the form of a two terminal substrate transistor (e.g., the substrate transistor 144 illustrated in FIG. 10) to provide temperature measurement. In such example, the substrate transistor may have the collector connected internally to ground. In the illustrated example, the thermal element 122 is in the form of a three terminal substrate PNP transistor (e.g., the transistor 180 of FIG. 1G) with the collector 186 coupled to ground by way of connection to the remote temperature sensor 502. The base-emitter voltage Vbe is equal to the forward voltage Vf across the transistor 180.

The remote temperature sensor 502 includes an interface 503 comprising a first terminal 504 connected to the first node 124 of the thermal element 122 and a second terminal 506 connected to the second node 170 of the thermal element 122. A third terminal 508 of the interface 503 is connected to the third node 172 of the thermal element 122. The processor substrate diode may have the collector available via a pinout, as illustrated in FIG. 5, wherein the third terminal 508 is connected to ground. The remote temperature sensor 502 includes a first switch 518 to selectively couple the third terminal 508 to an A/D converter 520, which is an analog to digital converter, and ground. In the example illustrated in FIG. 5, the first switch couples the third node 172 of the thermal element 122 (i.e., the collector 186 of the transistor 180) to ground. The remote temperature sensor 502 includes a second switch 519 to selectively couple the second terminal 506 to the first terminal 504, the third terminal 508, and the A/D converter 520. In an example, the second switch 519 may couple the second terminal 506 to the first terminal 504 to configure an external three terminal transistor (e.g., the transistor 168 of FIG. 1F) in a diode-connected configuration (e.g., the transistor 152 of FIG. 1D). In another example, the second switch 519 may couple the second terminal 506 to the third terminal 508 to configure an external three terminal external transistor (e.g., the transistor 180 of FIG. 1G) in a diode-connected configuration (e.g., the transistor 160 of FIG. 1E). Other arrangements and/or configurations of the interface 503, the first switch 518 and the second switch 519 are within the scope of the present disclosure.

The forward voltage Vf across the thermal element 122 is given by the following equation 2:

$$Vf = \eta \frac{kT}{q} \ln\left(\frac{If}{Is}\right) \qquad \text{Equation 2}$$

where η=the diode ideality factor; k=Boltzmann's constant, T=absolute temperature in ° Kelvin, q=electron charge, If=source forward current, and Is=saturation current of thermal element 122. A thermal voltage Vt, where Vt=kT/q, is about 25 millivolts (mV) at 300.15° Kelvin.

Thermal temperature measurement is based on a change in forward bias voltage ΔVbe of the thermal element 122 operated at two different currents, e.g., I_HIGH and I_LOW. The high forward bias voltage Vbe_HIGH is given by the following equation 3:

$$\text{Vbe\_HIGH} = \eta \frac{kT}{q} \ln\left(\frac{\text{I\_HIGH}}{Is}\right) \qquad \text{Equation 3}$$

The low forward bias voltage Vbe_LOW is given by the following equation 4:

$$\text{Vbe\_LOW} = \eta \frac{kT}{q} \ln\left(\frac{\text{I\_LOW}}{Is}\right) \qquad \text{Equation 4}$$

The change in forward bias voltage ΔVbe is given by the following equation 5:

$$\Delta Vbe = \Delta \text{Vbe\_HIGH} - \Delta \text{Vbe\_LOW} \qquad \text{Equation 5}$$

$$\Delta Vbe = \eta \frac{kT}{q} \ln\left(\frac{\text{I\_HIGH}}{\text{I\_LOW}}\right)$$

The equation 5 may be rearranged for temperature T by the following equation 6:

$$T = \frac{\Delta Vbe \cdot q}{\eta k \cdot \ln\left(\frac{\text{I\_HIGH}}{\text{I\_LOW}}\right)} \qquad \text{Equation 6}$$

According to some embodiments, in order to determine a temperature T of the thermal element 122, the remote temperature sensor 502 engages a current source 509. The current source 509 includes a high current source 510 and a low current source 512, which are alternately selected by a switch 514 and input to the emitter 182 of the transistor 180 by way of the first node 124. The A/D converter 520 includes a positive voltage terminal 522 and a negative voltage terminal 524. The negative voltage terminal 524 is selectively connected to the third terminal 508 of the interface 503 by way of the first switch 518. According to an example, the A/D converter 520 determines a floating voltage across the positive voltage terminal 522 and the negative voltage terminal 524. According to another example, the A/D converter selectively couples the negative voltage terminal 524 to ground to determine a voltage at the positive voltage terminal 522. According to the illustrated example, the first switch 518 and the second switch 519 are configured to connect the emitter 182 of the transistor 180 to the positive voltage terminal 522 and to connect the base 184 of the transistor 180 to the negative voltage terminal 524. The switch 514 of the current source 509 selects the high current source 510, and the high forward bias voltage Vbe_HIGH is read across the positive voltage terminal 522 and the negative voltage terminal 524 of the A/D converter 520. The high forward bias voltage Vbe_HIGH is converted into a digital signal by the A/D converter 520 and stored in a sensor control unit 526. The switch 514 then selects the low current source 512 (I_LOW), and the low forward bias voltage Vbe_LOW is read across the positive voltage terminal 522 and the negative voltage terminal 524 of the A/D converter 520. The low forward bias voltage Vbe_LOW is converted into a digital signal by the A/D converter 520 and stored in the sensor control unit 526. The sensor control unit 526 then performs the calculation of equation 6, and outputs the temperature T of the thermal element 122.

According to an example, the temperature T of the thermal element 122 may be determined in another configuration. The thermal element 122 may be operative with the collector 186 and the base 184 shorted by way of the second switch 519. The emitter 182 is connected to the positive voltage terminal 522 of the A/D converter 520 and the base 184 and the collector 186 are connected to the negative voltage terminal 524 of the A/D converter 520. In this configuration, the negative voltage terminal 524 of the A/D converter is not connected to ground. The switch 514 then selects the high current source 510, and a high forward bias voltage Vbe_HIGH is read across the positive voltage terminal 522 and the negative voltage terminal 524 of the A/D converter 520. The high forward bias voltage Vbe_HIGH is converted into a digital signal by the A/D converter 520 and stored in the sensor control unit 526. The switch 514 then selects the low current source 512, and the low forward bias voltage Vbe_LOW is read across the positive voltage terminal 522 and the negative voltage terminal 524 of the A/D converter 520. The low forward bias voltage Vbe_LOW is converted into a digital signal by A/D converter 520 and stored in sensor control unit 526. The sensor control unit 526 then performs the calculation of equation 6, and outputs the temperature T of the thermal element 122.

According to some embodiments, the remote temperature sensor 502 may provide beta compensation. The forward current gain, also known as "beta," of the thermal element 122 is not constant over changes in emitter currents and is not constant over changes in temperature. The variation in beta causes a change in measured temperature that is proportional to absolute temperature. Compensating for this variation in beta is known as beta compensation. Compensating for this variation in beta is also known as "implementing the BJT model" or "implementing the transistor model" for temperature measurement. For discrete transistors (e.g., the transistor 180 configured with the base 184 and the emitter 182 shorted together), a percent change in beta may be small. For example, a 10% variation in beta for two forced emitter currents (e.g., a high current I_HIGH output from the high current source 510 and a low current I_LOW output from the low current source 512) in a transistor with an ideal beta of 50 may contribute a change of approximately 0.25° C. at 100° C. However, for substrate transistors (e.g., the substrate transistor 144 illustrated in FIG. 1C) where the base-emitter junction is used for temperature measurement and the collector is tied to substrate ground, the proportional beta variation may be greater. For example, a 10% variation in beta for two forced emitter currents with a transistor whose ideal beta is 0.5 may contribute a change of approximately 8.25° C. at 100° C.

The thermal element 122 (e.g., the transistor 180) has an emitter current $I_E$, a collector current $I_C$ and a base current $I_B$. The relationship between the emitter current $I_E$, the collector current $I_C$, and beta (ß) is shown by the following equation 7:

$$I_E = I_C + \frac{I_C}{ß} = I_C \times \left(1 + \frac{1}{ß}\right) \quad \text{Equation 7}$$

According to an example, beta ß of the thermal element 122 may be measured by forcing different emitter currents $I_E$, (e.g., the high current I_HIGH output from the high current source 510 and the low current I_LOW output from the low current source 512) and measuring the base current $I_B$, by the following equation 8:

$$ß = \frac{I_E - I_B}{I_B} \quad \text{Equation 8}$$

According to some embodiments, a compensation unit 528 is provided in the remote temperature sensor 502 to provide beta compensation. The compensation unit 528 communicates with the current source 509, the A/D converter 520 and the sensor control unit 526. The temperature T of equation 6 is a measured temperature $T_M$ corresponding to the change in voltage across the positive voltage terminal 522 of the A/D converter 520 and the negative voltage terminal 524 of the A/D converter 520. In an example, the sensor control unit 526 provides beta compensation by adjusting the measured temperature $T_M$ by a predetermined value. In another example, the sensor control unit 526 provides beta compensation by adjusting the measured temperature $T_M$ by reference to a look-up table to provide the temperature T for the thermal element 122. In another example, the sensor control unit 526 provides beta compensation by adjusting the measured temperature $T_M$ determined in accordance with a programmed value or programmed values corresponding to a known beta compensation factor of the thermal element 122. In yet another example, the sensor control unit 526 provides beta compensation by adjusting the measured temperature $T_M$ in accordance with a beta compensation factor corresponding to the emitter current $I_E$, and/or the collector current $I_C$ supplied by the current source 509.

According to some embodiments, the compensation unit 528 controls the current source 509 to supply the emitter current $I_E$ to the emitter 182 of the transistor 180 at the first node 124 and measures or senses the base current $I_B$ at the second terminal 506. The emitter current $I_E$ and the base current $I_B$ are communicated to the sensor control unit 526, which calculates beta ß. The sensor control unit 526 uses the calculated beta B to adjust the measured temperature $T_M$. In an example, the sensor control unit 526 adjusts the measured temperature $T_M$ in accordance with predetermined offset temperature values corresponding to the calculated beta ß. The predetermined offset temperature values may be stored in a look-up table in the sensor control unit 526. Large values of beta B above a high beta threshold, e.g., beta ß>50, may have negligible effect on the measured temperature $T_M$. In an example with large values of beta B above the high beta threshold, the sensor control unit 526 may not provide adjustment to the measured temperature $T_M$.

According to some embodiments, the compensation unit 528 provides beta compensation by sensing the base current $I_B$ at the second terminal 506 and controlling the current source 509 to adjust the emitter current $I_E$ at the first node 124. The emitter current $I_E$ may be one of the forced emitter currents (e.g., the high current I_HIGH output from the high current source 510 or the low current I_LOW output from the low current source 512). The compensation unit 528 may adjust the high current I_HIGH and measure or sense the base current $I_B$ at the second terminal 506 according to equation 8 until beta ß is above the high beta threshold. Compensation unit 528 then selects the adjusted high current I_HIGH, and the temperature T is determined in accordance with equation 6. Likewise, the compensation unit 528 may adjust the low current I_LOW and sense the base current $I_B$ at the second terminal 506 according to equation 8 until beta ß is above the high beta threshold. The compensation unit 528 then selects the adjusted low current I_LOW, and the temperature T is determined in accordance with equation 6. Other methods or configurations for providing beta compensation are within the scope of the present disclosure.

According to some embodiments, the remote temperature sensor 502 provides series resistance compensation. Series resistance may result from physical properties of a PCB, such as trace resistance, line lengths, and line widths associated with PCB traces. Series resistance may also result from bulk resistance in remote temperature transistor junctions, series resistance in a CPU or an ASIC, package leads, or any parasitic resistance in a path of the thermal element 122. Series resistance may provide an offset in measured temperature $T_M$. If the series resistance is too high, a voltage input to the thermal element 122 at the first node 124 may impact performance by exceeding a design voltage threshold. Compensating for this variation in series resistance is known as series resistance compensation or series resistance cancellation. Voltage across the series resistance in the path of the thermal element 122 may cause a measured temperature $T_M$ to be offset (e.g., read higher and/or lower than an absolute temperature). The variance of offset between the measured temperature $T_M$ and the absolute temperature may be on the order of +0.7° C. per 0 or greater. The series resistance may change with the absolute temperature of the load 102. According to an example, as the absolute temperature of PCB traces in the load 102 increases from 20° C. to 60° C., the series resistance increases, such as an increase greater than 30%.

According to some embodiments, the compensation unit 528 in the remote temperature sensor 502 provides series resistance compensation. The compensation unit 528 communicates with the current source 509, the A/D converter 520 and the sensor control unit 526. The temperature T determined by equation 6 above provides a measured temperature $T_M$. In an example, the sensor control unit 526 provides series resistance compensation by adjusting the measured temperature $T_M$ by a predetermined value (e.g., subtracting a predetermined value). In another example, the sensor control unit 526 provides series resistance compensation by adjusting the measured temperature $T_M$ by reference to a look-up table in the sensor control unit 526. In another example, the sensor control unit 526 provides series resistance compensation by adjusting the measured temperature $T_M$ in accordance with a programmed value or programmed values corresponding to a known series resistance compensation factor of the thermal element 122.

According to some embodiments, the series resistance is modeled as a series resistor 530 with a series resistance, Rs. The series resistor 530 is modeled between the current source 509 and the first node 124 (i.e., the emitter 182 of the transistor 180). The first terminal 504 of the remote temperature sensor 502 is also connected to the first node 124. The series resistance, Rs, is related to the base-emitter voltage Vbe of the thermal element 122. In the illustrated example, a measured base-emitter voltage, Vbem, is sensed across the first terminal 504 and the second terminal 506 of the remote temperature sensor 502. The source current, Is, is a known value and is supplied from the current source 509. The measured base-emitter voltage Vbem is related to the base-emitter voltage Vbe. A measured change in the base-emitter voltage, $\Delta$Vbem, is related to the change in base-emitter voltage, $\Delta$Vbe, according to the following equation 9:

$$Vbem = Vbe + (Rs \cdot Is)$$

$$\Delta Vbem = \Delta Vbe + (Rs \cdot \Delta Is)$$

$$\Delta Vbe = \Delta Vbem - (Rs \Delta Is) \quad \text{Equation 9}$$

According to some embodiments, the temperature T of equation 6 is used with three forced source emitter currents, namely the high current I_HIGH output from the high current source 510, a medium current I_MED output from a medium current source 511, and the low current I_LOW output from the low current source 512. The change in base-emitter voltage, $\Delta$Vbe, corresponding to a change between the high current, I_HIGH, and the medium current, I_MED, is denoted as $\Delta$Vbe_HIGH_MED. The change in base-emitter voltage, $\Delta$Vbe, corresponding to a change between the medium current, I_MED, and the low current, I_LOW, is denoted as $\Delta$Vbe_MED_LOW. Equation 6 is then used to calculate a temperature T_HIGH_MED using the high current, I_HIGH, the medium current, I_MED, and the corresponding change in base-emitter voltage, $\Delta$Vbe_HIGH_MED. Likewise, equation 6 is used to calculate a temperature T_MED_LOW using the medium current, I_MED, the low current, I_LOW, and the corresponding change in base-emitter voltage, $\Delta$Vbe_MED_LOW. For a given temperature T, when measurements are conducted sequentially or in a short time period from one another, the calculated temperature, T_HIGH_MED, is an identity to the calculated temperature, T_MED_LOW, as set forth by the following equation 10: I_LOW $$T\_HIGH\_MED = T\_MED\_LOW \quad \text{Equation 10}$$

$$T\_HIGH\_MED = \frac{\Delta Vbe\_HIGH\_MED \cdot q}{\eta k \cdot \ln\left(\frac{I\_HIGH}{I\_LOW}\right)}$$

$$T\_MED\_LOW = \frac{\Delta Vbe\_MED\_LOW \cdot q}{\eta k \cdot \ln\left(\frac{I\_MED}{I\_LOW}\right)}$$

Equation 10 is rearranged according to the temperature identity, which provides for cancellation of constants q, $\eta$, and k according to the following equation 11:

$$\frac{\Delta Vbe\_HIGH\_MED \cdot q}{\eta k \cdot \ln\left(\frac{I\_MED}{I\_LOW}\right)} = \frac{\Delta Vbe\_MED\_LOW \cdot q}{\eta k \cdot \ln\left(\frac{I\_MED}{I\_LOW}\right)} \quad \text{Equation 11}$$

$$\frac{\Delta Vbe\_HIGH\_MED}{\ln\left(\frac{I\_HIGH}{I\_LOW}\right)} = \frac{\Delta Vbe\_MED\_LOW \cdot q}{\ln\left(\frac{I\_MED}{I\_LOW}\right)}$$

Equation 9 is substituted into equation 11, and the resulting equation is solved for the series resistance, Rs, according to the following equation 12:

$$\frac{\Delta Vbe\_HIGH\_MED - Rs(I\_HIGH - I\_MED)}{\ln\left(\frac{I\_HIGH}{I\_MED}\right)} = \quad \text{Equation 12}$$

$$\frac{\Delta Vbem\_MED\_LOW - Rs(I\_MED - I\_LOW)}{\ln\left(\frac{I\_MED}{I\_LOW}\right)}$$

$$Rs = \frac{\Delta Vbem\_MED\_LOW \cdot \ln\left(\frac{I\_HIGH}{I\_MED}\right) - \Delta Vbem\_HIGH\_MED \cdot \ln\left(\frac{I\_MED}{I\_LOW}\right)}{(I\_HIGH - I\_MED) \cdot \ln\left(\frac{I\_MED}{I\_LOW}\right) - (I\_MED - I\_LOW) \cdot \ln\left(\frac{I\_HIGH}{I\_MED}\right)}$$

In view of the above, the remote temperature sensor 502 provides series resistance cancellation using three forced source emitter currents (e.g., the high current, I_HIGH, the medium current, I_MED, and the low current, I_LOW) and detects two measured changes in base-emitter voltage (e.g., the change in base-emitter voltage between I_HIGH and I_MED, $\Delta$Vbem_HIGH_MED, and the change in base-emitter voltage between and I_MED and I_LOW, $\Delta$Vbem_MED_LOW). The compensation unit 528 controls the current source 509 to supply the three forced source emitter currents (I_HIGH, I_MED, I_LOW), and the two measured changes in base-emitter voltage ($\Delta$Vbem_HIGH_MED, $\Delta$Vbem_MED_LOW) are converted to digital values by the A/D converter 520 and communicated to the sensor control unit 526. The sensor control unit 526 stores the values of the three forced source emitter currents and stores the values of the two measured changes in base-emitter voltage, and calculates the series resistance Rs according to equation 12. Other methods or configurations for providing series resistance compensation or series resistance cancellation are within the scope of the present disclosure.

According to some embodiments, the remote temperature sensor 502 provides frequency hopping during the conversion of the two measured changes in base-emitter voltage ($\Delta$Vbem_HIGH_MED, $\Delta$Vbem_MED_LOW) by the A/D converter 520. The sensor control unit 526 provides digital averaging of the measured changes to improve integrity of the measured values. In an embodiment, the remote temperature sensor 502 is operative in an anti-parallel diode configuration. The remote temperature sensor 502 is operative to selectively tie the negative voltage terminal 524 of the A/D converter 520 to ground when the thermal element 122 is configured as the substrate transistor 144 of FIG. 10 (i.e., internally connected to ground or substrate ground). The first terminal 504 and the second terminal 506 may be alternately switched between the positive voltage terminal 522 and the negative voltage terminal 524 of the A/D converter 520 by the intermediate switch 521 to provide an anti-parallel diode configuration. The intermediate switch 521, also known as a 4-way switch, is double-pole double-throw (DPDT) switch having four terminals and configured to reverse connections between an input and an output. In this configuration, the number of pins (i.e., terminals) needed to connect the remote temperature sensor 502 to the thermal element 122 is reduced. In an embodiment, the remote temperature sensor 502 sequentially receives a plurality of temperature signals Tsig corresponding to a plurality of thermal elements. In the anti-parallel diode configuration, a pair of thermal elements 122 share two terminals, such as first terminal 504 and second terminal 506. The remote temperature sensor 502 then outputs a plurality of temperature values corresponding to the temperature T of each of the plurality of thermal didoes. In an example, six remote temperature signals Tsig corresponding to six thermal elements 122 may be received by the remote temperature sensor 502 with six pins as opposed to twelve pins. Other methods or configurations for providing frequency hopping or the anti-parallel diode configuration by the remote temperature sensor 502 are within the scope of the present disclosure.

Figure 6:
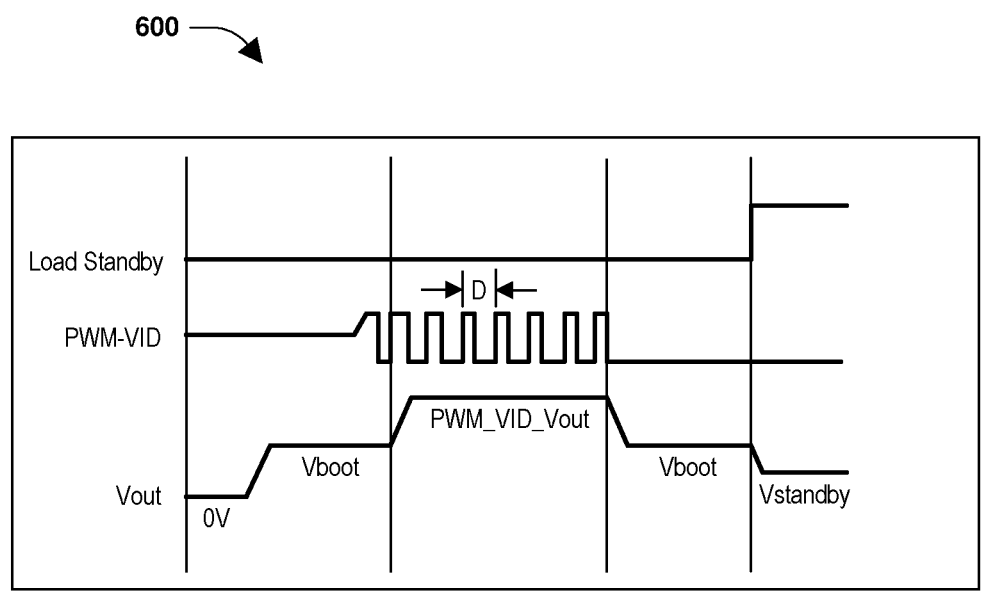
FIG. 6 illustrates a graph of an output voltage Vout output by a power converter, according to some embodiments.

FIG. 6 illustrates a graph 600 of an output voltage Vout output by the power converter 104, according to some embodiments. The controller 108 controls the power converter 104 and is one of a digital multi-phase controller or an analog multi-phase controller. In an example, the controller 108 is a digital multi-phase controller with a load-line 116 operative as a programmable load-line and outputting a modulation signal Mod to control the plurality of power stages 105. In this example, the controller 108 is operative to output the modulation signal Mod in response to a duty cycle (D) of a modulation signal PWM-VID. The modulation signal PWM-VID is a pulse width modulation signal including voltage identification (VID) information. The VID information is encoded in the duty cycle D of the modulation signal PWM-VID and the controller 108 extracts the VID information to control the output voltage Vout. In another example, the controller 108 is an analog multi-phase controller operative to override the modulation signal Mod with the modulation signal PWM-VID.

During system boot, the controller 108 controls the plurality of power stages 105 to increase the output voltage Vout to an initial boot voltage (Vboot). The controller 108 then increases the output voltage Vout from the initial boot voltage Vboot to a higher voltage (PWM_VID_Vout) until the current information Imon indicates that the load current Iout has reached an operating current level along the load-line 116. The controller 108 increases the output voltage Vout to the higher voltage PWM_VID_Vout in response to the modulation signal PWM-VID. The controller 108 responds to the duty cycle D of the modulation signal PWM-VID to increase the output voltage Vout of the plurality of power stages 105 from the initial boot voltage Vboot to the higher voltage PWM_VID_Vout. After the current information Imon indicates that the load current Iout has reached the operating current level along the load-line 116, the controller 108 reduces the output voltage Vout from the higher voltage PWM_VID_Vout back to the lower boot voltage Vboot. In an example, the output voltage Vout is reduced by reducing the duty cycle D of the modulation signal PWM-VID or by setting the duty cycle D of the modulation signal PWM-VID to zero. In another example, the output voltage Vout is increased by increasing the duty cycle D of the modulation signal PWM-VID. According to an example, the controller 108 lowers the output voltage Vout to a standby level (Vstandby) in response to the load 102 communicating a standby mode along the load bus 142. Additional values of output voltage Vout may be implemented by varying the duty cycle D of the modulation signal PWM-VID. According to an example, the output voltage Vout implemented by the controller 108 is continuous.

In an example of a network/packet processor as the load 102, a design output voltage Vout may be 0.75 V and a design load current Iout may change between 400 A and 1000 A in response to an operational state of the load 102 (e.g., the idle state with no packet traffic or the processing state when processing packet traffic). The controller 108 initiates a soft-start of the power converter 104 and controls the plurality of power stages 105 to provide a boot voltage Vboot of 0.75 V. The modulation signal PWM-VID is then received by the controller 108 and toggles with the duty cycle D. The controller 108 then controls the plurality of power stage 105 to increase the output voltage Vout to a voltage PWM_VID_Vout of 0.82 V. When the current information Imon indicates that the load current Iout reaches a value of 600 A, the modulation signal PWM-VID is grounded and the output voltage Vout returns to the boot voltage Vboot of 0.75 V (e.g., in response to power consumption by the load 102). If the voltage information Vmon indicates that the output voltage Vout falls below the boot voltage Vboot of 0.75 V, the modulation signal PWM-VID again toggles with the duty cycle D and the controller 108 controls the plurality of power stage 105 to increase the output voltage Vout to 0.75 V. Other methods and/or configurations for providing the output voltage Vout are within the scope of the present disclosure.

Figure 7:
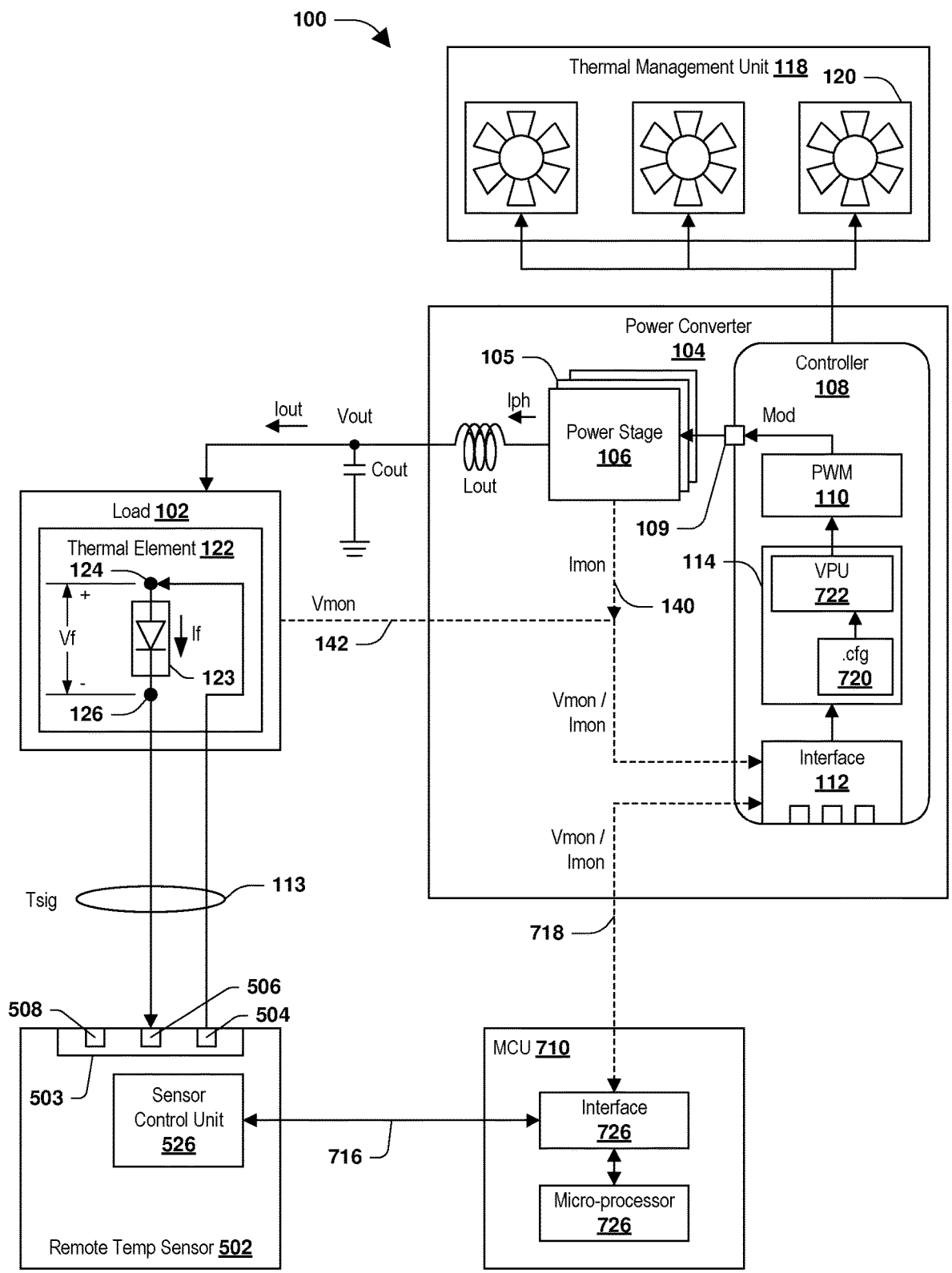
FIG. 7 illustrates an electronic system including a load and a power converter, according to some embodiments.

FIG. 7 illustrates the electronic system 100 including the load 102 and the power converter 104, according to some embodiments. The power converter 104 is operative to regulate the output voltage Vout provided to the load 102. The controller 108 is a digital multi-phase controller or an analog multi-phase controller with a programmable load-line. The electronic system 100 comprises the remote temperature sensor 502 and a micro-control unit 710. In an embodiment, the micro-control unit 710 is operative to function as the micro-control unit 410 in the controller 108 illustrated in FIG. 4 or the circuitry 114 illustrated in FIG. 1A. In another embodiment, the micro-control unit 710 is an independent circuit element in a PCB. The micro-control unit 710 includes an interface 712 and a processor 714. The processor 714 may be a CPU, an ASIC, an FPGA, etc. The remote temperature sensor 502 receives the temperature signal Tsig from the thermal element 122 through the first communication bus 113. The thermal element 122 is illustrated as the thermal diode 123 of FIG. 1B. The forward voltage Vf of the thermal diode 123 corresponds to the base-emitter voltage Vbe, set forth above with reference to FIG. 5, for series resistance compensation and beta compensation. According to some embodiments, the thermal element may be configured as any of the examples of FIGS. 1C-1I, or provided in another configuration. The remote temperature sensor 502 converts the temperature signal Tsig into a digital signal including the temperature value, and communicates the temperature value to the interface 712 of the micro-control unit 710 through a second communication bus 716. The interface 712 of the micro-control unit 710 communicates the temperature value to the processor 714. The interface 712 of the micro-control unit 710 also receives the current information Imon about the load current Iout of the load 102 and the voltage information Vmon about the output voltage Vout through a third communication bus 718. The micro-control unit 710 updates the load-line 116 in response to the temperature value, the current information Imon, and the voltage information Vmon, as set forth above. The micro-control unit 710 communicates information corresponding to the updated load-line 116 to the controller 108, which controls the phase current Iph of each power stage of the plurality of power stages 105 to provide the output voltage Vout to the load 102, as set forth above.

According to an embodiment, the controller 108 is a multi-phase controller with a programmable load-line, and the micro-control unit 710 updates the programmable load-line with the information corresponding to the updated load-line 116. According an embodiment, the controller 108 is a multi-phase controller with a static load-line having programmable load-line threshold values, and the micro-control unit 710 changes the programmable load-line threshold values according to the information corresponding to the updated load-line 116. According an embodiment, the controller 108 is a multi-phase controller with a plurality of selectable static load-lines, and the micro-control unit 710 selects a static load-line of the plurality of selectable static load-lines according to the information corresponding to the updated load-line 116. According to an embodiment, the controller 108 is a digital multi-phase controller with a dynamic load-line. The dynamic load-line is programmed by the micro-control unit 710 by changing one or more registers corresponding to one or more dynamically programmable thresholds (e.g., the first threshold 204 and the second threshold 206, each configured as dynamically programmable thresholds) according to the information corresponding to the updated load-line 116. According to an example of a network/packet processor as the load 102, the one or more dynamically programmable thresholds represent a boundary between the idle state and the processing state of the load 102.

According to an embodiment, the controller 108 is a digital controller, where the modulator 110 is operative to generate the modulation signal Mod to control the plurality of power stages 105 based on a default load-line. The default load-line has a slope that determines the rate of change of the output voltage Vout in response to the load current Iout indicated by the current information Imon. The default load-line is enabled in a configuration file 720, (.cfg), stored in the controller 108. To implement the default load-line, the modulator 110 accesses the configuration file 720 and generates the modulation signals Mod to control the plurality of power stages 105 based on the default load-line in the configuration file 720. According to an example, the default load-line is static, and the slope of the default load-line may not change over the defined operating range of the power converter 104. The controller 108 changes the output voltage Vout in response to the load current Iout indicated by the current information Imon along the default load-line.

The micro-control unit 710 outputs a modulation signal PWM-VID, corresponding to the updated load-line 116, along the third communication bus 718 to the interface 112 of the controller 108. The circuitry 114 of the controller 108 includes a voltage position unit 722 that overrides the default load-line to output a modulation signal Mod corresponding to the modulation signal PWM-VID received at the interface 112, as set forth above with reference to FIG. 6. According to an example, the controller 108 outputs the modulation signal Mod corresponding to the duty cycle D of the modulation signal PWM-VID output by the micro-control unit 710. In an example of a network/packet processor as the load 102, the voltage position unit 722 overrides the default load-line (e.g., the static load-line 116a of FIG. 2D) over a low load current range (e.g., the second current range i_range22 in FIG. 2D) and/or a high load current range (e.g., the third current range i_range23 in FIG. 2D). This approach effectively converts the default load-line (e.g., the static load-line 116a) with a predetermined slope into a non-linear load-line (e.g., the dynamic load-line 222) with one or more portions having different slopes. Other arrangements and/or configurations for updating the controller 108 according to the updated load-line 116 are within the scope of the present disclosure.

According to some embodiments, the second communication bus 716 or the third communication bus 718 is one of an Inter-Integrated Circuit bus (I2C bus), a System Management bus (SMBus), a Power Management Bus (PMBus), an Adaptive Voltage Bus (AVSBus), or a general-purpose input/output (GPIO) bus. According to an example, the second communication bus 716 is an I2C bus or an SMBus and the third communication bus 718 is an I2C bus, an SMBus, a PMBus, or an AVSBus. The sensor control unit 726, the interface 712, and the interface 112 are operative to communicate by way of the second communication bus 716 and/or the third communication bus 718. The I2C bus reference design provides a 7-bit address space and communication bus speeds from 100 kilobits per second (kbit/s) to 5 megabits/s (Mbit/s). The SMBus is a single-ended two-wire bus with a clock frequency (i.e., bus speed) range from 10 kilohertz (kHz) to 100 kHz and a 32 byte limit (256 bits), and is generally used for non-configurable lightweight communication. The PMBus is a variant of the SMBus, which is targeted at digital management of power supplies with a 400 kHz bus speed and blocks up to 255 bytes. The AVSBus an open standard and a variant of the PMBus bus, which is targeted at digital management of power supplies with a bus speed up to 50 MHz and a block size of 32 bits. The GPIO bus refers to an uncommitted digital signal bus, which is generally controllable at runtime. The GPIO bus includes a plurality of signal lines, which may be used as an input, an output, or both on an integrated circuit (IC) or PCB. According to an embodiment, the second communication bus 716 and the third communication bus 718 are provided as an 120 bus to communicate at least one of the temperature value, the current information Imon, the voltage information Vmon, or the modulation signal PWM-VID. Other arrangements and/or configurations of the second communication bus 716 and the third communication bus 718 are within the scope of the present disclosure.

Figure 8:
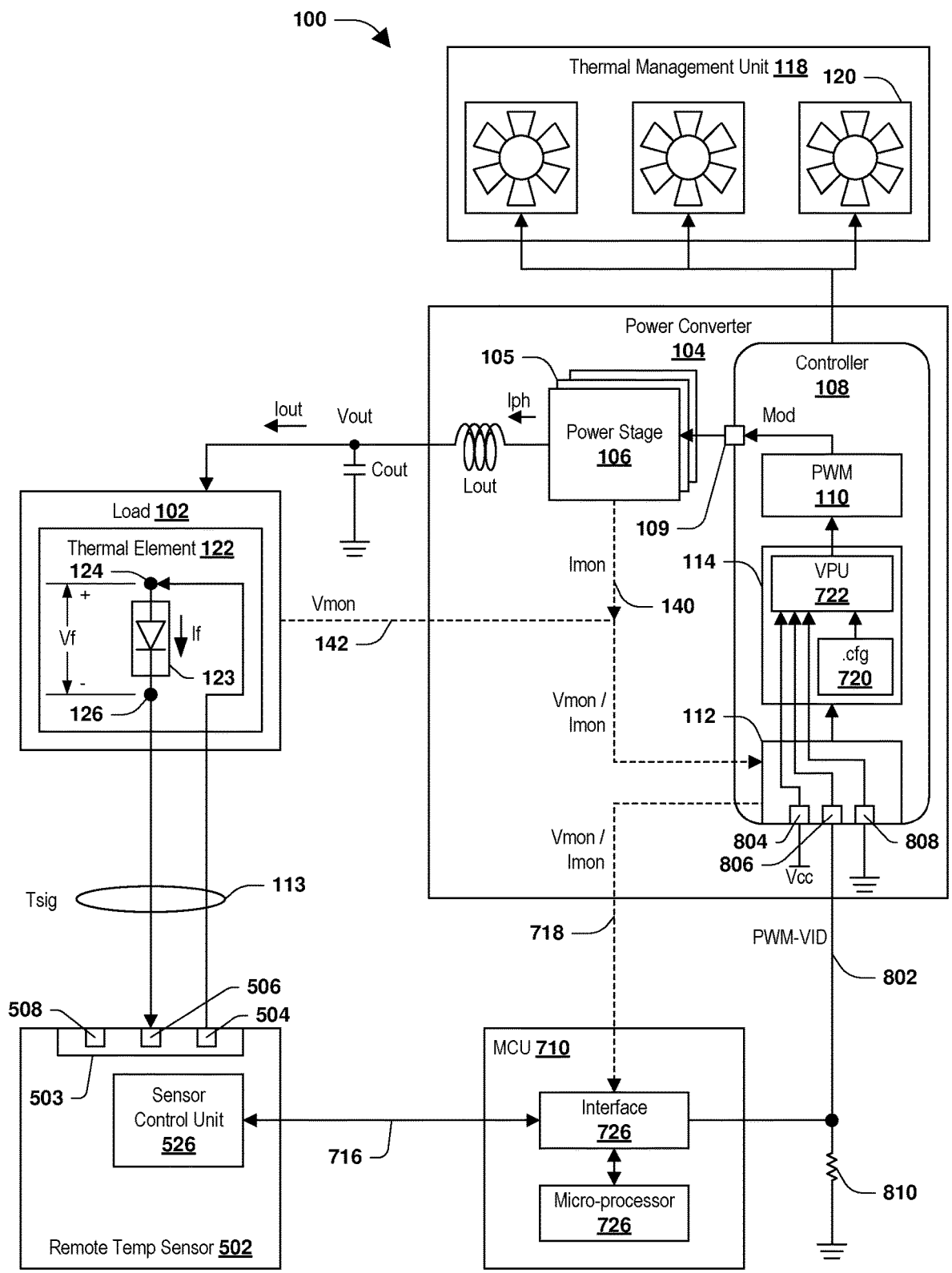
FIG. 8 illustrates an electronic system including a load and a power converter, according to some embodiments.

FIG. 8 illustrates the electronic system 100 including the load 102 and the power converter 104, according to some embodiments. The power converter 104 is operative to regulate the output voltage Vout provided to the load 102. The controller 108 is a digital multi-phase controller or an analog multi-phase controller. The micro-control unit 710 and the remote temperature sensor 502 are independent circuit elements in a PCB. The micro-control unit 710 updates the load-line 116 in response to the temperature value received through the second communication bus 716, and the current information Imon and the voltage information Vmon received through the third communication bus 718, as set forth above.

The micro-control unit 710 communicates the modulation signal PWM-VID to the voltage position unit 722 through the interface 112 of the controller 108 along a fourth communication bus 802, according to some embodiments. The fourth communication bus 802 is a unidirectional digital bus, such as the GPIO bus set forth above. The interface 112 of the controller 108 includes terminals for configuring the controller 108. The interface 112 includes an AVS_CLK terminal 804, which is an adaptive voltage scaling clock terminal to receive a clock signal, a PWM_VID terminal 806, which is a terminal to receive the modulation signal PWM-VID, and an AVS_SDAT terminal 808, which is an adaptive voltage scaling serial data terminal to receive a signal indicating the presence of serial data on the PWM VID terminal 806. In an embodiment where the micro-control unit 710 controls the controller 108 to implement the load-line 116 with the modulation signal PWM-VID, the AVS_CLK terminal 804 is coupled to a direct current (DC) reference voltage Vcc, the PWM_VID terminal 806 is connected to the interface 712 of the micro-control unit 710 with a signal line of the fourth communication bus 802, and the AVS_SDAT terminal 808 is coupled to ground. In an example, the signal line of the fourth communication bus 802 is biased to ground by way of a pull-down resistor 810. In an example, the pull-down resistor 810 is 10 kiloohms (kΩ) and the reference voltage Vcc is 3.3 V. Other arrangements and/or configurations of the controller 108 to receive the modulation signal PWM-VID are within the scope of the present disclosure. For example, the pull-down resistor 810 may be omitted such that the signal line of the fourth communication bus 802 is floating. Likewise, coupling of the AVS_CLK terminal 804 to the reference voltage Vcc and coupling of the AVS_SDAT terminal 808 to ground may be omitted depending upon an implementation of the signaling.

The voltage position unit 722 overrides a default load-line of the controller 108 to output a modulation signal Mod corresponding to the modulation signal PWM-VID. According to an example, the controller 108 extracts the VID information from the duty cycle D of the modulation signal PWM-VID output by the micro-control unit 710 and outputs the modulation signal Mod corresponding to the duty cycle D. In an example of a network/packet processor as the load 102, the voltage position unit 722 overrides the default load-line (e.g., the static load-line 116a of FIG. 2D) over a low load current range (e.g., the second current range i_range22 in FIG. 2D) and/or a high load current range (e.g., the third current range i_range23 in FIG. 2D). According to another example, the controller 108 replaces the modulation signal Mod with the modulation signal PWM-VID output by the micro-control unit 710. Other arrangements and/or configurations for overriding the default load-line by the controller 108 are within the scope of the present disclosure.

Figure 9:
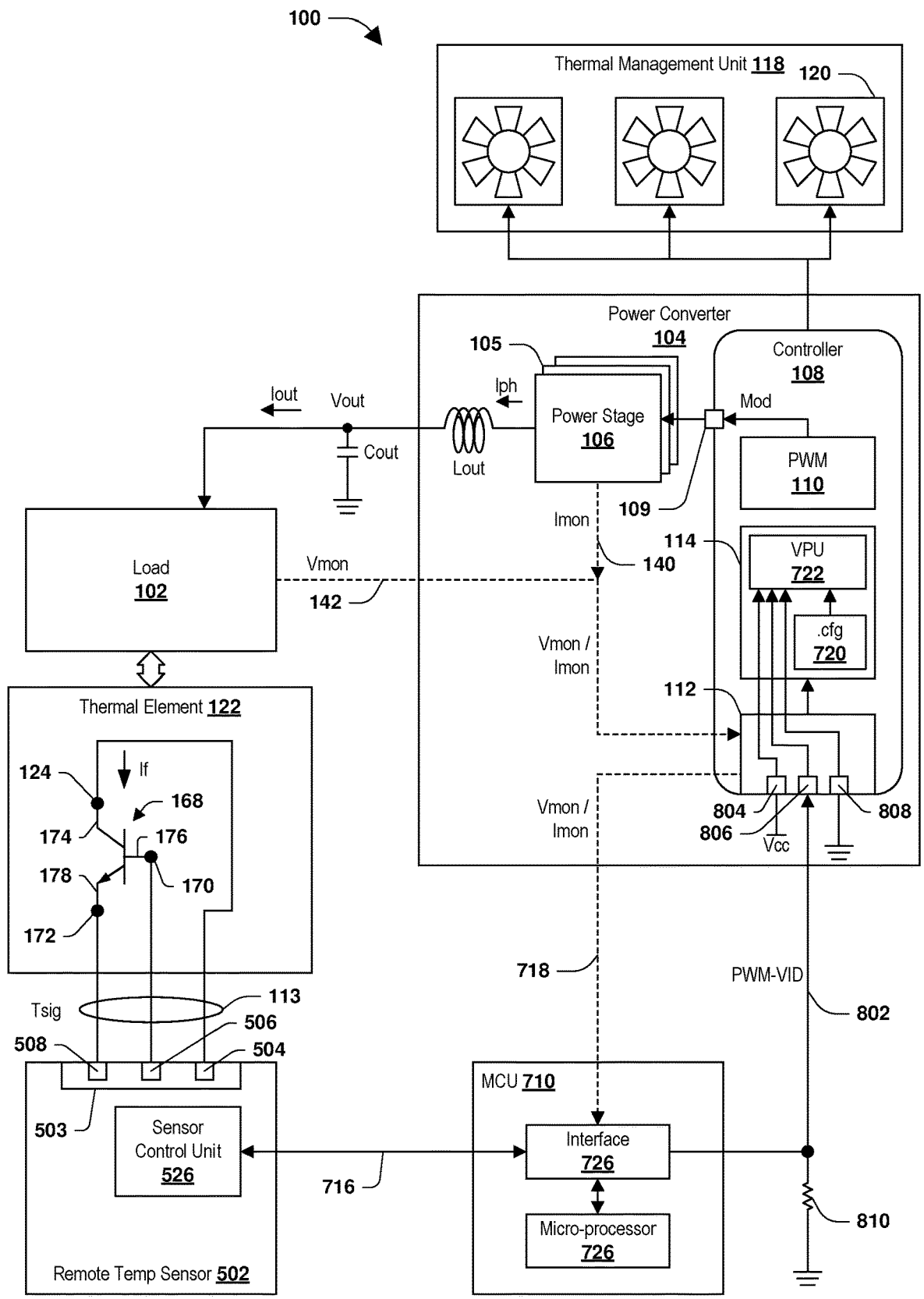
FIG. 9 illustrates an electronic system including a load and a power converter, according to some embodiments.

FIG. 9 illustrates the electronic system 100 including the load 102 and the power converter 104, according to some embodiments. The thermal element 122 is separate from the load 102 and is in close proximity to the load 102 to measure temperature value and communicate the temperature value in the temperature signal Tsig by way of the first communication bus 113. The thermal element 122 is illustrated in the configuration of the transistor 168 of FIG. 1F (e.g., an NPN transistor). The thermal element 122 may be alternately configured as set forth above, such as a PNP transistor, an NPN bipolar junction (BJT) transistor, a PNP BJT transistor, an NPN transistor in a diode-connected configuration with the base shorted to the collector, a PNP transistor in a diode-connected configuration with the base shorted to the collector, a PNP transistor in a transistor-connected configuration with the collector tied to ground, or a substrate PNP transistor in a transistor-connected configuration with the collector tied to local ground, such as the substrate (e.g., substrate ground) of the PNP transistor. The thermal element 122 communicates with the remote temperature sensor 502 to provide the temperature signal Tsig. The transistor 168 includes a collector 174 coupled to the first terminal 504 of the remote temperature sensor 502 through the first node 124. The base 176 is coupled to the second terminal 506 through the second node 170 and the emitter 178 is coupled to the third terminal 508 through the third node 172.

According to an embodiment, the controller 108 is at least one of digital single-phase or multi-phase controller with a programmable non-linear load-line, a digital single-phase or multi-phase controller with a plurality of programmable load-lines, a digital single-phase or multi-phase controller with one or more static load-lines, or an analog single-phase or multi-phase controller with one or more static load-lines, illustrated above with reference to FIG. 1A or FIG. 4. According to an embodiment, the controller 108 is a digital multi-phase controller or an analog multi-phase controller with a programmable load-line that is controlled by a micro-control unit 710, illustrated above with reference to FIG. 7 or FIG. 8. Other arrangements and/or configurations of the thermal element 902 and the controller 108 are within the scope of the present disclosure.

Figure 10:
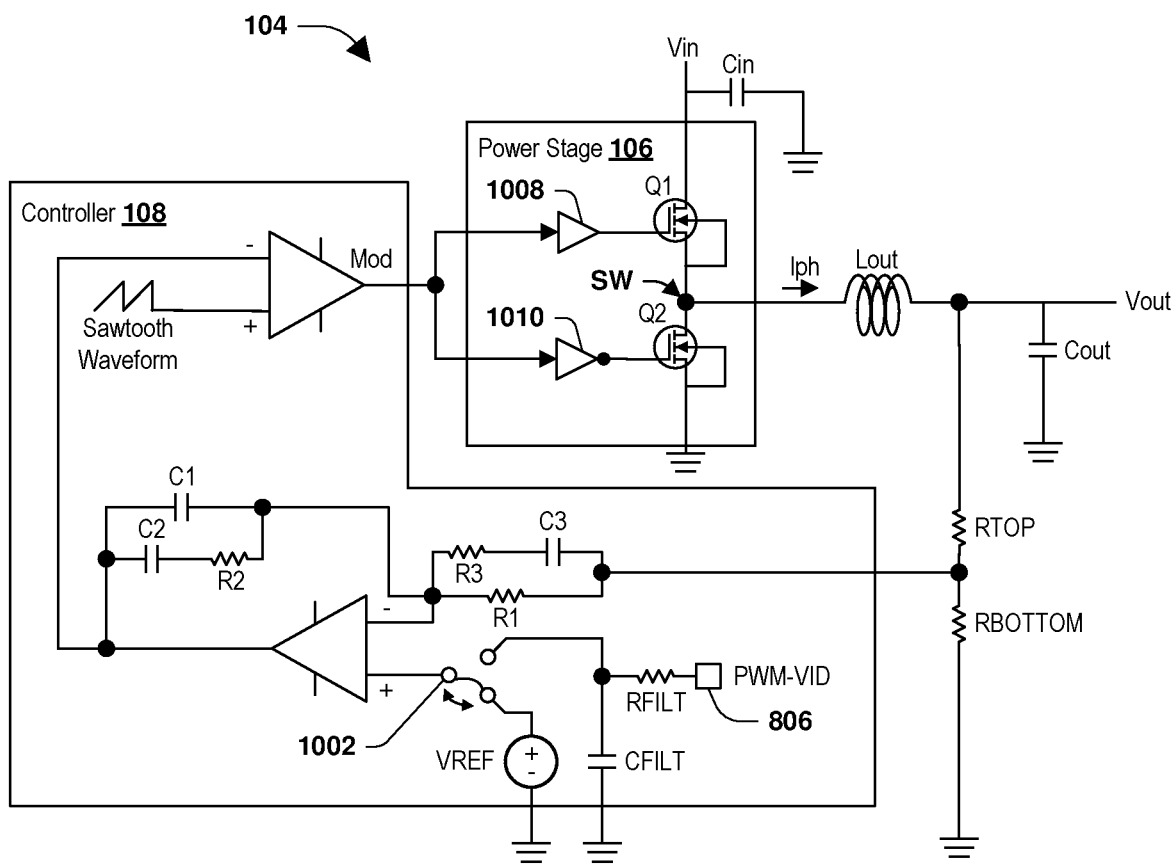
FIG. 10 illustrates a power converter including a controller and a power stage, according to some embodiments.

FIG. 10 illustrates the power converter 104 including the controller 108 and the power stage 106, according to some embodiments. The controller 108 is an analog controller and includes the circuitry 114 for adjusting the output voltage Vout in response to the modulation signal PWM-VID received at the PWM_VID terminal 806. A switch 1002, such as a transistor, is operative to select an internal reference voltage (VREF) to follow the static load-line 116a of FIG. 2B. The switch 1002 senses the presence of the modulation signal PWM-VID at the PWM_VID terminal 806 and when present is operative to replace the internal reference voltage VREF with the modulation signal PWM-VID. In other words, the switch 1002 is operative to select a voltage level indicated by the modulation signal PWM-VID as a target output voltage Vout. The switch 1002 may be activated or deactivated by the duty cycle D of the modulation signal PWM-VID, by amplitude modulation, or by some another signal processing technique. The PWM_VID terminal 806 for receiving the modulation signal PWM-VID may include an RC filter RFILT, CFILT.

An error amplifier 1004 compares the voltage selected by the switch 1002 the output voltage Vout after being divided down by a resistor divider formed by a series-connected resistor RTOP, RBOTTOM. The error amplifier 1004 may have a first RC network R1, R3, C3 at a negative input and a second RC network R2, C1, C2 at an output of the error amplifier 1004. In this embodiment, the modulator 110 of the controller 108 is a PWM comparator 1006. The output of the error amplifier 1004 is coupled to a positive input of the PWM comparator 1006, and a negative input of the PWM comparator 1006 receives a saw tooth waveform signal. The output of the PWM comparator 1006 is a PWM signal Mod having a duty cycle which is based on a difference between the saw tooth waveform signal and the output of the error amplifier 1004. The PWM signal Mod controls the phase current Iph of the power stage 106 so as to regulate the output voltage Vout provided to the load 102.

The power stage 106 includes a high-side driver 1008 for driving the gate of a high-side power transistor Q1 and a low-side driver 1010 for driving the gate of a low-side power transistor Q2, responsive to the PWM signal Mod generated by the PWM comparator 1006. The high-side power transistor Q1 is coupled between a switch node (SW) and an input voltage (Vin) which may be filtered by an input capacitor (Cin). The low-side power transistor Q2 is coupled between the switch node SW and a reference point such as ground. In an example of a buck converter, the series-connected power transistors Q1, Q2 deliver a phase current Iph at the switch node SW for the power stage 106 to the corresponding output inductor Lout. A buck converter topology is shown merely as an example. In general, any type of power converter/voltage regulator topology may be employed for regulating the output voltage Vout provided to the load 102. According to an embodiment, the controller 108 includes a plurality of PWM comparators 1006, each outputting a corresponding modulation signal Mod, and the power stage 106 is a power stage of the plurality of power stages 105 illustrated above with reference to FIG. 1A. Each of the modulation signals Mod controls a corresponding power stage of the plurality of power stages 105 to output a corresponding phase current Iph across a corresponding output inductor Lout to provide the output voltage Vout. Other arrangements and/or configuration of the power converter 104 are within the scope of the present disclosure.

Figure 11:
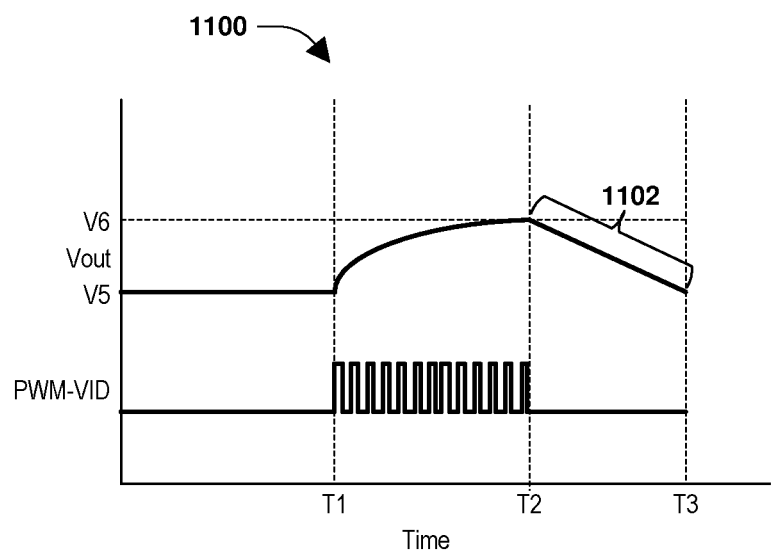
FIG. 11 illustrates a graph of an output voltage by a controller in response to a modulation signal, according to some embodiments.

FIG. 11 illustrates a graph 1100 of the output voltage Vout by the controller 108 of FIG. 10 in response to the modulation signal PWM-VID, according to some embodiments. At a time T1, the modulation signal PWM-VID is received at the PWM_VID terminal 806 and the output voltage Vout increases from a fifth voltage value V5 to a sixth voltage value V6. The sixth voltage value V6 is higher than the fifth voltage value V5 and corresponds to the voltage indicated by the modulation signal PWM-VID. At a time T2, the sixth voltage value V6 reaches the voltage indicated by the modulation signal PWM-VID. According to an embodiment, the modulation signal PWM-VID is discontinued at the time T2 and the output voltage Vout follows a load-line indicated by the portion 1102. According to an embodiment, the portion 1102 of the output voltage Vout corresponds to the first portion 224 of the dynamic load-line 222 of FIG. 2B. According to another embodiment, the portion 1102 of the output voltage Vout corresponds to the first portion 224 and the second portion 226 of the dynamic load-line 222 of FIG. 2B. Other arrangements and/or configurations of the output voltage Vout in response to the modulation signal PWM-VID are within the scope of the present disclosure.

Figure 12:
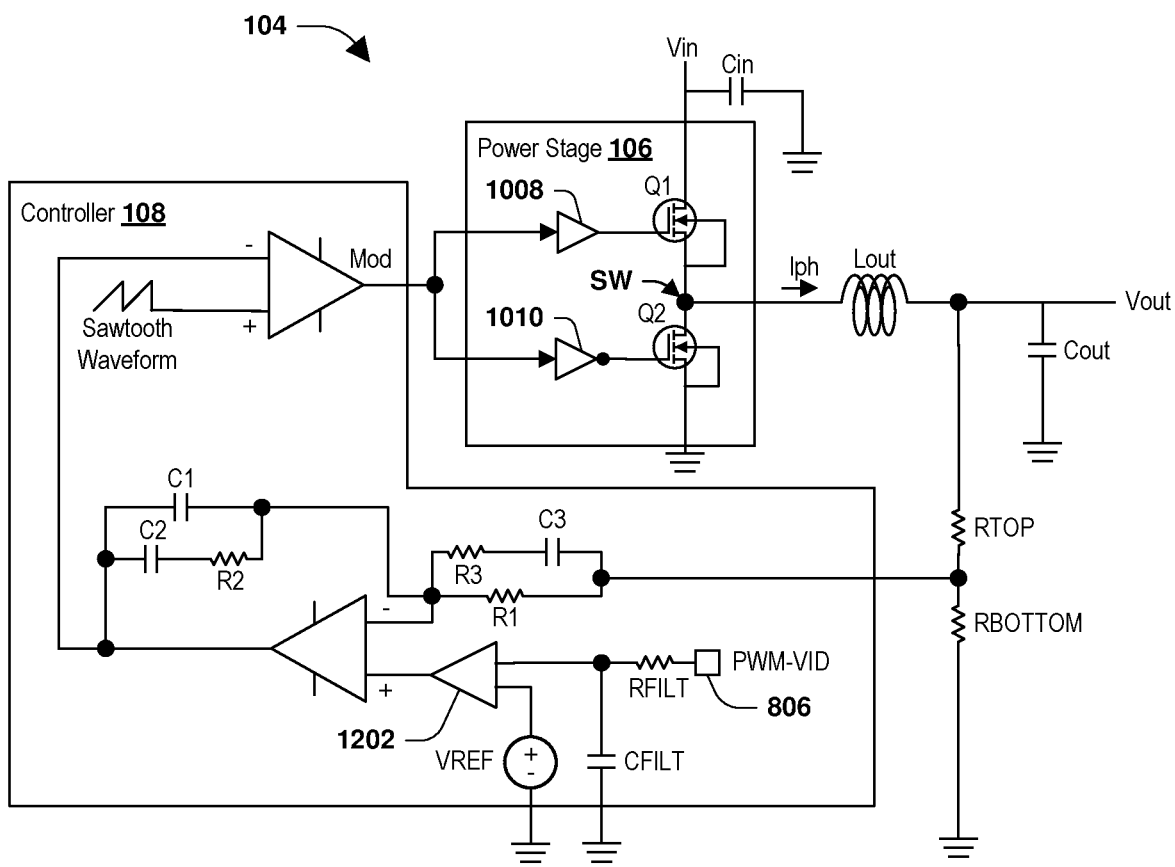
FIG. 12 illustrates a power converter including a controller and a power stage, according to some embodiments.

FIG. 12 illustrates the power converter 104 including the controller 108 and the power stage 106, according to some embodiments. The controller 108 is an analog controller and includes the circuitry 114 for adjusting the output voltage Vout in response to the modulation signal PWM-VID received at the PWM_VID terminal 806. Different from FIG. 10, the circuitry 114 includes a summing circuit 1202 in place of the switch 1002. The summing circuit 1202 is operative to sum a voltage value indicated by the modulation signal PWM-VID received at the PWM_VID terminal 806 with an internal reference voltage VREF to determine the voltage for the output voltage Vout when the modulation signal PWM-VID is present at the at the PWM_VID terminal 806.

Figure 13:
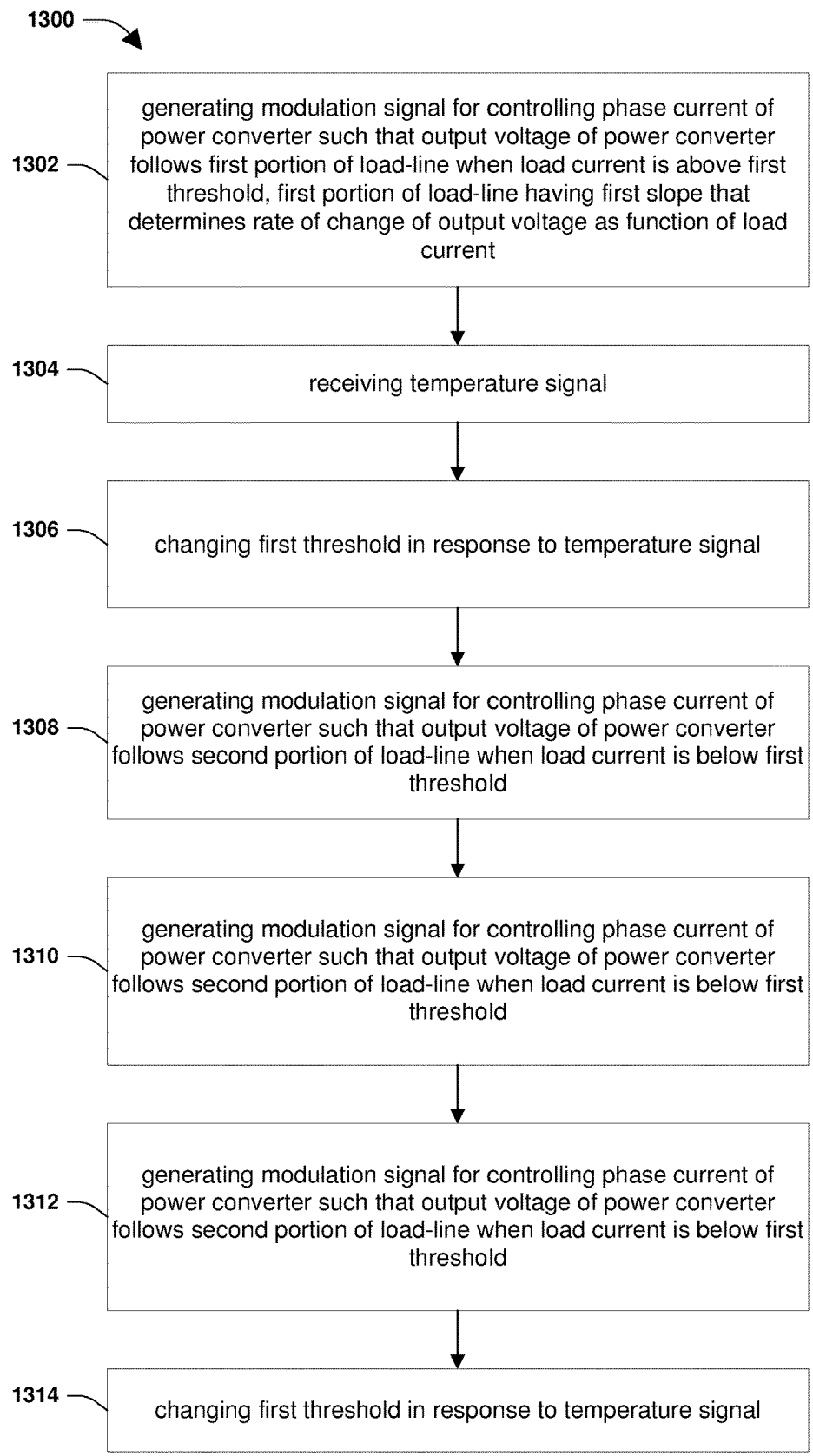
FIG. 13 illustrates a flowchart of a method for controlling the power converter 104, according to some embodiments.

FIG. 13 illustrates a flowchart 1300 of a method for controlling the power converter 104, according to some embodiments. At 1302, a modulation signal Mod is generated with a modulator 110 of a controller 108 for controlling a phase current Iph of the power converter 104. Alternatively, a modulation signal PWM-VID is generated by a micro-control unit 710 and communicated to the controller 108 for controlling a phase current Iph of the power converter 104. An output voltage Vout of the power converter 104 follows a first portion 202 of a load-line 116 when a load current Iout is above a first threshold 204. The first portion 202 of the load-line 116 has a first slope S21 that determines a rate of change of the output voltage Vout as a function of the load current Iout.

At 1304, a temperature signal Tsig is received at an interface 112 of the controller 108. Alternatively, the temperature signal Tsig is received at an interface 503 of a remote temperature sensor 502.

At 1306, the first threshold 204 is changed in response to the temperature signal Tsig by the controller 108. Alternatively, the first threshold 204 is changed in response to the temperature signal Tsig by the micro-control unit 710, which responds to the temperature signal Tsig received by the remote temperature sensor 502.

At 1308, the load-line 116 comprises a second portion 210 having a second slope S22 different from the first slope S21. The second portion 210 determines a rate of change of the output voltage Vout as a function of the load current Iout. The modulation signal Mod controls the phase current Iph of the power converter 104 such that the output voltage Vout of the power converter 104 follows the second portion 210 of the load-line 116 when the load current Iout is below the first threshold 204.

At 1310, the load-line 116 comprises a third portion 212 having a third slope S23 different from the first slope S21. The third portion 212 determines a rate of change of the output voltage Vout as a function of the load current Iout. The modulation signal Mod controls the phase current Iph of the power converter 104 such that the output voltage Vout of the power converter 104 follows the third portion 212 of the load-line 116 when the load current Iout is above a second threshold 206.

At 1312, the modulation signal Mod controls the phase current Iph of the power converter 104 such that the output voltage Vout of the power converter 104 follows the first portion 202 of the load-line 116 when the load current Iout is below the second threshold 206. The first slope S21 of the first portion 202 of the load-line 116 is a function of the first threshold 204 and the second threshold 206.

At 1314, the second threshold 206 is changed by the controller 108 in response to the temperature signal Tsig. Alternatively, the second threshold 206 is changed in response to the temperature signal Tsig by the micro-control unit 710, which responds to the temperature signal Tsig received by the remote temperature sensor 502.

Although the present disclosure is not so limited, the following numbered examples demonstrate one or more aspects of the disclosure.

Example 1. A controller for a power converter, the controller comprising: an output terminal operative to output a modulation signal for controlling a phase current of the power converter; a modulator operative to generate the modulation signal such that an output voltage of the power converter follows a first portion of a load-line when load current is above a first threshold, the first portion of the load-line having a first slope that determines a rate of change of the output voltage as a function of the load current; an interface operative to receive a temperature signal; and circuitry operative to change the first threshold in response to receipt of the temperature signal.

Example 2. The controller of example 1, wherein the temperature signal indicates a temperature value and the circuitry is operative to change the first threshold in response to the temperature value.

Example 3. The controller of any of examples 1 through 2, wherein the load-line comprises a second portion having a second slope different from the first slope that determines a rate of change of the output voltage as a function of the load current, and the modulator is operative to generate the modulation signal such that the output voltage of the power converter follows the second portion of the load-line when the load current is below the first threshold.

Example 4. The controller of any of examples 1 through 3, wherein the load-line comprises a third portion having a third slope different from the second slope that determines a rate of change of the output voltage as a function of the load current, and the modulator is operative to generate the modulation signal such that the output voltage of the power converter follows the third portion of the load-line when the load current is above a second threshold.

Example 5. The controller of any of examples 1 through 4, wherein the circuitry is operative to change the second threshold in response to receipt of the temperature signal.

Example 6. The controller of any of examples 1 through 5, wherein the temperature signal indicates a temperature value and the circuitry is operative to change the second threshold in response to the temperature value.

Example 7. The controller of any of examples 1 through 6, wherein the first portion of the load-line is associated with a first current range and the load draws a processing current in the first current range, the second portion of the load-line is associated with a second current range and the load draws an idle current less than the processing current in the second current range, and the circuitry is operative to change the first threshold in response to the temperature signal such that the load draws the idle current in the first current range.

Example 8. The controller of any of examples 1 through 7, wherein a third portion of the load-line is associated with a third current range and the load draws a processing current in the third current range, and the circuitry is operative to change a second threshold in response to the temperature signal such that the load draws the processing current in the first current range.

Example 9. The controller of any of examples 1 through 8, comprising: a plurality of output terminals operative to output a plurality of modulation signals for controlling a corresponding plurality of phase currents of the power converter, wherein the controller is a digital controller and the load-line is enabled in a configuration file stored in the digital controller.

Example 10. The controller of any of examples 1 through 9, wherein the controller is an analog controller, the output voltage is associated with a first voltage value corresponding to the first threshold, the circuitry comprises a summing circuit operative to sum a voltage value corresponding to the temperature signal received at the interface with a voltage value of an internal reference voltage to change the first voltage value to a second voltage value higher than the first voltage value, and the modulator is operative to generate the modulation signal such that the output voltage of the power converter follows a changed first portion of the load-line in association with the second voltage value when load current is above the first threshold.

Example 11. The controller of any of examples 1 through 10, wherein the output voltage of the power converter follows the first portion of the load-line when the load current is below a second threshold, and the first slope is a function of the first threshold and the second threshold.

Example 12. A method for controlling a power converter, the method comprising: generating a modulation signal, with a modulator, for controlling a phase current of the power converter such that an output voltage of the power converter follows a first portion of a load-line when load current is above a first threshold, the first portion of the load-line having a first slope that determines a rate of change of the output voltage as a function of the load current; receiving, at an interface, a temperature signal; and changing the first threshold in response to the temperature signal.

Example 13. The method of example 12, wherein the load-line comprises a second portion having a second slope different from the first slope, the second portion determining a rate of change of the output voltage as a function of the load current, and wherein generating the modulation signal comprises: generating the modulation signal, with the modulator, for controlling the phase current of the power converter such that the output voltage of the power converter follows the second portion of the load-line when the load current is below the first threshold.

Example 14. The method of any of examples 12 through 13, wherein the load-line comprises a third portion having a third slope different from the second slope, the third portion determining a rate of change of the output voltage as a function of the load current, and wherein generating the modulation signal comprises: generating the modulation signal, with the modulator, for controlling the phase current of the power converter such that the output voltage of the power converter follows the third portion of the load-line when the load current is above a second threshold.

Example 15. The method of any of examples 12 through 14, wherein generating the modulation signal comprises generating the modulation signal, with the modulator, such that the output voltage of the power converter follows the first portion of the load-line when the load current is below a second threshold, and the first slope is a function of the first threshold and the second threshold; and the method comprises changing the second threshold in response to the temperature signal.

Example 16. An electronic system, comprising: a plurality of power stages to output a corresponding plurality of phase currents to a load; and a controller comprising: a modulator operative to generate a modulation signal for controlling each of the plurality of power stages to output the corresponding plurality of phase currents, wherein an output voltage of the plurality of power stages follows a load-line when load current is between a first threshold and a second threshold, the load-line having a slope that determines a rate of change of the output voltage as a function of the load current; an interface operative to receive a signal indicating a change to the first threshold and the second threshold; and circuitry operative to change at least one of the first threshold or the second threshold in response the signal indicating the change.

Example 17. The electronic system of example 16, comprising: a thermal element to output a signal corresponding to a temperature value of a load, wherein the signal indicating the change to the first threshold and the second threshold comprises the temperature value of the load.

Example 18. The electronic system of any of examples 16 through 17, wherein the signal output by the thermal element is an analog signal, the electronic system comprising: a temperature sensor to receive the analog signal and to convert the analog signal into a digital signal, wherein the signal indicating the change to the first threshold and the second threshold corresponds to the digital signal.

Example 19. The electronic system of any of examples 16 through 18, comprising: a microcontroller to receive the digital signal and to produce the signal indicating the change to the first threshold and the second threshold in response to the digital signal and a predetermined design current value of the load, wherein the microcontroller communicates the signal indicating the change to the first threshold and the second threshold to the interface over a communication bus.

Example 20. The electronic system of any of examples 16 through 19, wherein the plurality of power stages follows the load-line when the load current is above the first threshold and is below the second threshold, and the slope is a function of the first threshold and the second threshold.

Example 21. An apparatus for controlling a power converter. The apparatus comprises: means for generating a modulation signal, with a modulator, for controlling a phase current of the power converter such that an output voltage of the power converter follows a first portion of a load-line when load current is above a first threshold, the first portion of the load-line having a first slope that determines a rate of change of the output voltage as a function of the load current; means for receiving, at an interface, a temperature signal; and means for changing the first threshold in response to the temperature signal.

It may be appreciated that combinations of one or more embodiments described herein, including combinations of embodiments described with respect to different figures, are contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A controller for a power converter, the controller programmed with a first current threshold usable to control an output voltage of the power converter, the controller comprising:
an output terminal operative to output a modulation signal for controlling a phase current of the power converter;
a modulator operative to generate the modulation signal such that the output voltage of the power converter follows a first portion of a load-line when load current is above the first current threshold with which the controller is programmed to control the output voltage, the first portion of the load-line having a first slope that determines a rate of change of the output voltage as a function of the load current;
an interface operative to receive a temperature signal; and
circuitry operative to change the first current threshold, with which the controller is programmed to control the output voltage, to a second current threshold in response to receipt of the temperature signal.

2. The controller of claim 1, wherein the temperature signal indicates a temperature value and the circuitry is operative to change the first current threshold in response to the temperature value.

3. The controller of claim 1, wherein the load-line comprises a second portion having a second slope different from the first slope that determines a rate of change of the output voltage as a function of the load current, and the modulator is operative to generate the modulation signal such that the output voltage of the power converter follows the second portion of the load-line when the load current is below the first current threshold.

4. The controller of claim 3, wherein the controller is programmed with a third current threshold usable to control the output voltage of the power converter, wherein the load-line comprises a third portion having a third slope different from the second slope that determines a rate of change of the output voltage as a function of the load current, and the modulator is operative to generate the modulation signal such that the output voltage of the power converter follows the third portion of the load-line when the load current is above the third current threshold with which the controller is programmed to control the output voltage.

5. The controller of claim 4, wherein the circuitry is operative to change the third current threshold with which the controller is programmed to control the output voltage in response to receipt of the temperature signal.

6. The controller of claim 5, wherein the temperature signal indicates a temperature value and the circuitry is operative to change the third current threshold with which the controller is programmed to control the output voltage in response to the temperature value.

7. The controller of claim 3, wherein the first portion of the load-line is associated with a first current range and the load draws a processing current in the first current range, the second portion of the load-line is associated with a second current range and the load draws an idle current less than the processing current in the second current range, and the circuitry is operative to change the first current threshold in response to the temperature signal such that the load draws the idle current in the first current range.

8. The controller of claim 7, wherein the controller is programmed with a second threshold usable to control the output voltage of the power converter, wherein a third portion of the load-line is associated with a third current range and the load draws a processing current in the third current range, and the circuitry is operative to change the second threshold with which the controller is programmed to control the output voltage in response to the temperature signal such that the load draws the processing current in the first current range.

9. The controller of claim 1, comprising:
a plurality of output terminals operative to output a plurality of modulation signals for controlling a corresponding plurality of phase currents of the power converter, wherein the controller is a digital controller and the load-line is enabled in a configuration file stored in the digital controller.

10. A controller for a power converter, the controller comprising:
an output terminal operative to output a modulation signal for controlling a phase current of the power converter;
a modulator operative to generate the modulation signal such that an output voltage of the power converter follows a first portion of a load-line when load current is above a first current threshold, the first portion of the load-line having a first slope that determines a rate of change of the output voltage as a function of the load current;
an interface operative to receive a temperature signal; and
circuitry operative to change the first current threshold, to a second current threshold, in response to receipt of the temperature signal, wherein
the controller is an analog controller,
the output voltage is associated with a first voltage value corresponding to the first current threshold,
the circuitry comprises a summing circuit operative to sum a voltage value corresponding to the temperature signal received at the interface with a voltage value of an internal reference voltage to change the first voltage value to a second voltage value higher than the first voltage value, and
the modulator is operative to generate the modulation signal such that the output voltage of the power converter follows a changed first portion of the load-line in association with the second voltage value when load current is above the first current threshold.

11. The controller of claim 10, wherein the output voltage of the power converter follows the first portion of the load-line when the load current is below the second current threshold with which the controller is programmed to control the output voltage, and the first slope is a function of the first current threshold and the second current threshold.

12. A method for controlling a power converter for which a first current threshold is programmed and usable to control an output voltage of the power converter, the method comprising:
generating a modulation signal, with a modulator, for controlling a phase current of the power converter such that the output voltage of the power converter follows a first portion of a load-line when load current is above the first current threshold usable to control the output voltage, the first portion of the load-line having a first slope that determines a rate of change of the output voltage as a function of the load current;
receiving, at an interface, a temperature signal; and
changing the first current threshold, usable to control the output voltage, to a second current threshold in response to the temperature signal.

13. The method of claim 12, wherein the load-line comprises a second portion having a second slope different from the first slope, the second portion determining a rate of change of the output voltage as a function of the load current, and wherein generating the modulation signal comprises:
generating the modulation signal, with the modulator, for controlling the phase current of the power converter such that the output voltage of the power converter follows the second portion of the load-line when the load current is below the first current threshold.

14. The method of claim 13, wherein the load-line comprises a third portion having a third slope different from the second slope, the third portion determining a rate of change of the output voltage as a function of the load current, and wherein generating the modulation signal comprises:
generating the modulation signal, with the modulator, for controlling the phase current of the power converter such that the output voltage of the power converter follows the third portion of the load-line when the load current is above the second current threshold usable to control the output voltage.

15. The method of claim 12, wherein
generating the modulation signal comprises generating the modulation signal, with the modulator, such that the output voltage of the power converter follows the first portion of the load-line when the load current is below the second current threshold usable to control the output voltage, and the first slope is a function of the first current threshold and the second current threshold; and
the method comprises changing the second current threshold usable to control the output voltage in response to the temperature signal.

16. An electronic system, comprising:
a plurality of power stages to output a corresponding plurality of phase currents to a load; and
a controller programmed with at least one of a first current threshold usable to control an output voltage or a second current threshold usable to control the output voltage, the controller comprising:
a modulator operative to generate a modulation signal for controlling each of the plurality of power stages to output the corresponding plurality of phase currents, wherein the output voltage of the plurality of power stages follows a load-line when load current is between the first current threshold and the second current threshold, the load-line having a slope that determines a rate of change of the output voltage as a function of the load current;

an interface operative to receive a signal indicating a change to the first current threshold with which the controller is programmed to control the output voltage and the second current threshold with which the controller is programmed to control the output voltage; and circuitry operative to change at least one of the first current threshold, with which the controller is programmed to control the output voltage, or the second current threshold, with which the controller is programmed to control the output voltage, to a third current threshold in response the signal indicating the change.

17. The electronic system of claim 16, comprising:

a thermal element to output a signal corresponding to a temperature value of a load, wherein the signal indicating the change to the first current threshold with which the controller is programmed to control the output voltage and the second current threshold with which the controller is programmed to control the output voltage comprises the temperature value of the load.

18. The electronic system of claim 17, wherein the signal output by the thermal element is an analog signal, the electronic system comprising:

a temperature sensor to receive the analog signal and to convert the analog signal into a digital signal, wherein the signal indicating the change to the first current threshold with which the controller is programmed to control the output voltage and the second current threshold with which the controller is programmed to control the output voltage corresponds to the digital signal.

19. The electronic system of claim 18, comprising:

a microcontroller to receive the digital signal and to produce the signal indicating the change to the first current threshold with which the controller is programmed to control the output voltage and the second current threshold with which the controller is programmed to control the output voltage in response to the digital signal and a predetermined design current value of the load, wherein the microcontroller communicates the signal indicating the change to the first current threshold with which the controller is programmed to control the output voltage and the second current threshold with which the controller is programmed to control the output voltage to the interface over a communication bus.

20. The electronic system of claim 16, wherein the plurality of power stages follows the load-line when the load current is above the first current threshold with which the controller is programmed to control the output voltage and is below the second current threshold with which the controller is programmed to control the output voltage, and the slope is a function of the first current threshold with which the controller is programmed to control the output voltage and the second current threshold with which the controller is programmed to control the output voltage.

* * * * *